US012526059B2

United States Patent
Miura

(10) Patent No.: US 12,526,059 B2
(45) Date of Patent: Jan. 13, 2026

(54) SIGNAL PROCESSING APPARATUS, RADIO COMMUNICATION APPARATUS, SIGNAL PROCESSING METHOD, AND NON-TRANSITORY COMPUTER READABLE MEDIUM ON WHICH PROGRAM IS STORED

(71) Applicant: NEC Corporation, Tokyo (JP)

(72) Inventor: Takuma Miura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 320 days.

(21) Appl. No.: 18/281,999

(22) PCT Filed: Jan. 13, 2022

(86) PCT No.: PCT/JP2022/000936
§ 371 (c)(1),
(2) Date: Sep. 14, 2023

(87) PCT Pub. No.: WO2022/201764
PCT Pub. Date: Sep. 29, 2022

(65) Prior Publication Data
US 2024/0171292 A1 May 23, 2024

(30) Foreign Application Priority Data
Mar. 22, 2021 (JP) ................. 2021-046725

(51) Int. Cl.
*H04B 17/13* (2015.01)
*H04B 17/21* (2015.01)

(52) U.S. Cl.
CPC ............. *H04B 17/13* (2015.01); *H04B 17/22* (2023.05)

(58) Field of Classification Search
CPC .......... H04B 17/13; H04B 17/22; H04B 7/06; H03F 1/32; H03F 3/24
(Continued)

(56) References Cited

U.S. PATENT DOCUMENTS 6,304,140 B1 10/2001 Thron et al.
7,915,954 B2 * 3/2011 Raghupathy .......... H03F 1/0222
330/149
(Continued)

FOREIGN PATENT DOCUMENTS

JP 2006-005525 A 1/2006
JP 2009-111958 A 5/2009
(Continued)

OTHER PUBLICATIONS

International Search Report for PCT Application No. PCT/JP2022/000936, mailed on Mar. 1, 2022.

*Primary Examiner* — Don N Vo

(57) ABSTRACT

A signal processing apparatus according to the present disclose includes: a regulation unit configured to regulate one or both of an input signal and a calibration signal for performing calibration of transmission systems so that a difference between signal power of the input signal and signal power of the calibration signal is reduced; a compensation unit configured to perform distortion compensation for the input signal and the calibration signal; an amplifier configured to amplify the input signal and the calibration signal; and an output unit configured to output the input signal and the calibration signal that have been regulated by the regulation unit to the amplifier. Thus, there are provided the signal processing apparatus, a radio communication apparatus, a signal processing method, and a program that reduce non-linear distortion of an amplifier and distortion caused by a memory effect of the amplifier in the calibration signal.

20 Claims, 16 Drawing Sheets

(58) Field of Classification Search
USPC .................................................... 455/115.1
See application file for complete search history.

(56) References Cited

U.S. PATENT DOCUMENTS

| | | | |
|---|---|---|---|
| 10,135,550 B1* | 11/2018 | Cheng | ................. H04L 27/3863 |
| 2012/0149322 A1* | 6/2012 | Kuo | .................... H04W 52/367 |
| | | | 455/234.1 |
| 2013/0052960 A1* | 2/2013 | Do | ........................ H03F 1/3288 |
| | | | 455/67.11 |

FOREIGN PATENT DOCUMENTS

| | | |
|---|---|---|
| JP | 2018-195955 A | 12/2018 |
| WO | 2019/193641 A1 | 10/2019 |

* cited by examiner

| (d1) | (c1) | (b1) | (a1) | (a2) | (b2) | (c2) | (d2) |
|---|---|---|---|---|---|---|---|
| 8 | 9 | 10 | 11 | 12 | 13 | 14 | 15 |
| 24 | 25 | 26 | 27 | 28 | 29 | 30 | 31 |
| 0 | 1 | 2 | 3 | 4 | 5 | 6 | 7 |
| 16 | 17 | 18 | 19 | 20 | 21 | 22 | 23 |

Fig. 8

SIGNAL PROCESSING APPARATUS, RADIO COMMUNICATION APPARATUS, SIGNAL PROCESSING METHOD, AND NON-TRANSITORY COMPUTER READABLE MEDIUM ON WHICH PROGRAM IS STORED

This application is a National Stage Entry of PCT/JP2022/000936 filed on Jan. 13, 2022, which claims priority from Japanese Patent Application 2021-046725 filed on Mar. 22, 2021, the contents of all of which are incorporated herein by reference, in their entirety.

TECHNICAL FIELD

The present disclosure relates to a signal processing apparatus, a radio communication apparatus, a signal processing method, and a program.

BACKGROUND ART

Base station equipment for mobile phones employs a technique called digital beamforming and a digital circuit for regulating a phase and an amplitude of a signal in a transmission system for each antenna. In order to generate a beam to be output in a desired direction from an antenna, the phase and the amplitude at an end of each antenna are tuned into predetermined values. Therefore, the transmission system associated with each antenna needs to be calibrated.

When levels of DL signals to be transmitted by antennas are different, since a DL calibration signal depends on the level of the DL signal and non-linear distortion and distortion caused by a memory effect are generated, there occurs a problem that accuracy of calibration varies among antennas. For this reason, base station equipment that performs digital pre-distortion (DPD) has increased. DPD is processing of superimposing, in order to improve a distortion characteristic of a power amplifier, a distortion component having an inverse characteristic to the distortion characteristic of the power amplifier on a transmitted signal before the signal is input to the power amplifier. By superimposing the distortion component having the inverse characteristic on the transmitted signal, distortion of the transmitted signal that has passed through the power amplifier is reduced and the distortion characteristic of the power amplifier is compensated. However, regardless of DPD being enabled or disabled, accuracy of calibration is different, and it is necessary to clearly identify an influence of the non-linear distortion of the amplifier that affects the DL calibration signal, and DPD compensation processing.

Patent Literature 1 discloses a technique in which non-linear distortion generated by an amplifier is reduced in a radio communication system by providing DPD at a front stage of the amplifier.

CITATION LIST

Patent Literature

Patent Literature 1: Japanese Unexamined Patent Application Publication No. 2009-111958

SUMMARY OF INVENTION

Technical Problem

Depending on an amplifier, a memory effect may be generated in input/output characteristics of the amplifier, the memory effect being caused by dependence of an output signal from the amplifier on a history of past input signals. Due to the memory effect, an output signal in response to an input signal may not be fixed and may depend on past input signals. Due to this memory effect, when a setting of radio communication is calibrated and a DL calibration signal is input to the amplifier, the DL calibration signal to be amplified by the amplifier and to be output reflects an influence of the memory effect.

In the technique disclosed in Patent Literature 1, DPD suppresses the memory effect with respect to the DL signal. Therefore, influences of the memory effect and non-linear distortion of the transmitting amplifier remain in the DL calibration signal, and calibration may not be accurately performed.

The present disclosure has been made in order to solve such a problem, and an object of the present disclosure is to provide a signal processing apparatus, a radio communication apparatus, a signal processing method, and a program that reduce non-linear distortion of an amplifier and distortion caused by a memory effect of the amplifier in a calibration signal.

Solution to Problem

A signal processing apparatus according to the present disclosure includes: a regulation unit configured to regulate one or both of an input signal and a calibration signal for performing calibration of transmission systems so that a difference between signal power of the input signal and signal power of the calibration signal is reduced; a compensation unit configured to perform distortion compensation for the input signal and the calibration signal; an amplifier configured to amplify the input signal and the calibration signal; and an output unit configured to output the input signal and the calibration signal that have been regulated by the regulation unit to the amplifier.

A radio communication apparatus according to the present disclosure includes: regulating means for regulating one or both of an input signal and a calibration signal for performing calibration of transmission systems in such a way that a difference between signal power of the input signal and signal power of the calibration signal is reduced; compensating means for performing distortion compensation for the input signal and the calibration signal; an amplifier configured to amplify the input signal and the calibration signal; and output means for outputting the input signal and the calibration signal that have been regulated by the regulating means to the amplifier.

A signal processing method according to the present disclosure includes: a regulation step of regulating one or both of an input signal and a calibration signal for performing calibration of transmission systems so that a difference between signal power of the input signal and signal power of the calibration signal is reduced; a compensation step of performing distortion compensation for the input signal and the calibration signal; an amplification step of amplifying the input signal and the calibration signal; and an output step of outputting the input signal and the calibration signal that have been regulated in the regulation step to the amplifier.

A program according to the present disclosure causes a signal processing apparatus to execute: regulation processing of regulating one or both of an input signal and a calibration signal for performing calibration of transmission systems so that a difference between signal power of the input signal and signal power of the calibration signal is reduced; and output processing of outputting the input signal and the calibration signal that have been regulated in the regulation processing to the amplifier.

According to the present disclosure, there can be provided a signal processing apparatus, a radio communication apparatus, a signal processing method, and a program that reduce non-linear distortion of an amplifier and distortion caused by a memory effect of the amplifier in a calibration signal.

BRIEF DESCRIPTION OF DRAWINGS

FIG. 8 is a diagram illustrating one example of arrangement of associated antennas.

EXAMPLE EMBODIMENTS

Example embodiments will be described below with reference to the drawings. Note that the drawings are schematic and technical scope of the example embodiments shall not be construed to be limited on the basis of the drawings. Note that identical elements are denoted by the same reference signs and redundant description thereof is omitted.

First Example Embodiment

Figure 1:
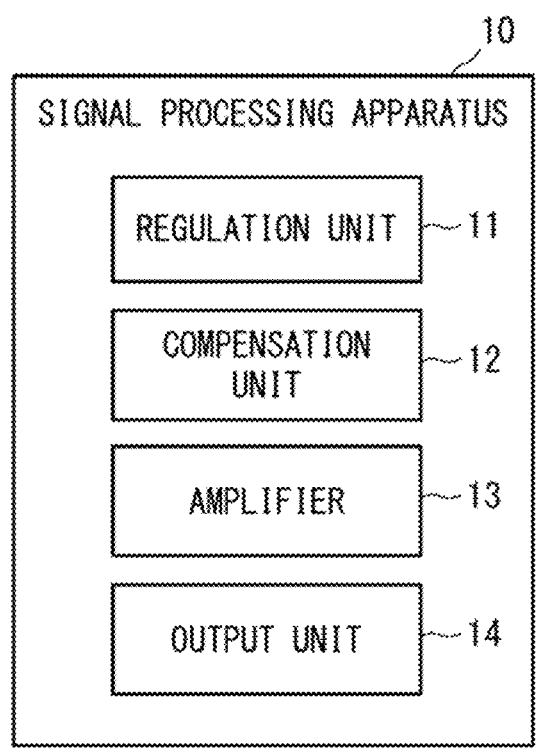
FIG. 1 is a configuration diagram of a signal processing apparatus according to a first example embodiment of the present disclosure.

A first example embodiment will be described with reference to FIG. 1. FIG. 1 is a configuration diagram of a signal processing apparatus 10 according to the present example embodiment.

The signal processing apparatus 10 according to the present example embodiment includes a regulation unit 11, a compensation unit 12, an amplifier 13, and an output unit 14.

The regulation unit 11 regulates one or both of an input signal and a calibration signal for performing calibration of transmission systems are regulated in such a way that difference between signal power of the input signal and signal power of the calibration signal is reduced. The compensation unit 12 performs distortion compensation for the input signal and the calibration signal. The amplifier 13 amplifies the input signal and the calibration signal. The output unit 14 outputs the input signal and the calibration signal, both of which have been regulated by the regulation unit 11, to the amplifier 13.

The signal processing apparatus 10 according to the present example embodiment can reduce non-linear distortion of the amplifier and distortion caused by a memory effect of the amplifier in the calibration signal.

Second Example Embodiment

Figure 2:
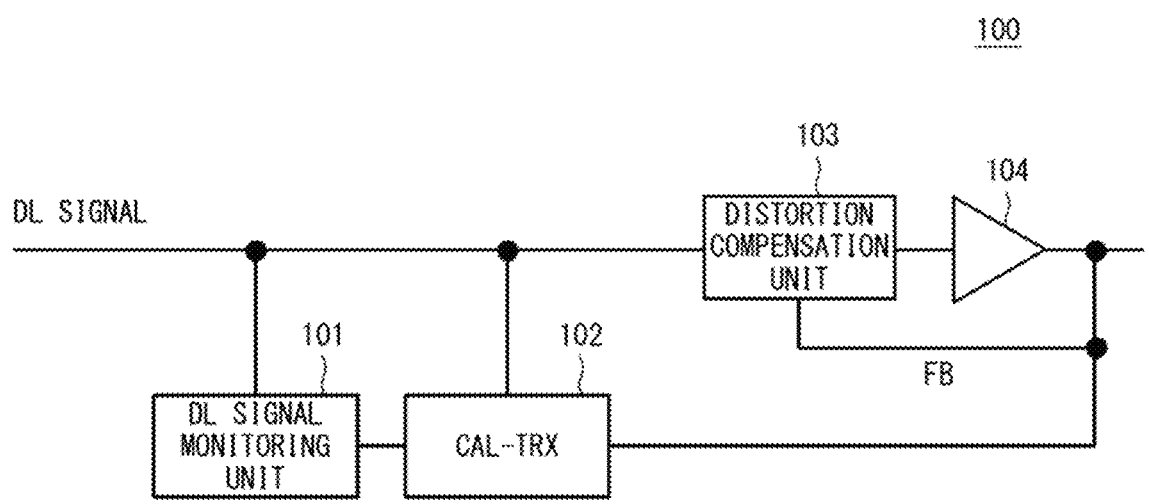
FIG. 2 is a conceptual configuration diagram of a signal processing apparatus according to a second example embodiment of the present disclosure.

A signal processing apparatus 100 according to the second example embodiment is described with reference to FIG. 2. FIG. 2 is a conceptual configuration diagram of the signal processing apparatus 100 according to the present example embodiment.

A configuration of the signal processing apparatus 100 according to the present example embodiment is described with reference to FIG. 2. FIG. 2 is a configuration diagram of the signal processing apparatus 100 according to the present example embodiment. The signal processing apparatus 100 includes a DL signal monitoring unit 101, a CAL-TRX 102, a distortion compensation unit 103, and an amplifier 104. Note that, although only one signal processing apparatus 100 is illustrated in FIG. 2, two or more signal processing apparatuses may be provided.

The DL signal monitoring unit 101 receives a DL signal that is a signal to be input, and performs operation for generating a DL calibration signal based on the DL signal. The result of operation by the DL signal monitoring unit 101 is input to the CAL-TRX 102 and the distortion compensation unit 103. In a specific example of the operation performed by the DL signal monitoring unit 101, an average value of power of the DL signal is calculated. At any given time, the average values of power for I and Q of the DL signal can be calculated by performing an operation represented by equation 1 below. I and Q respectively denotes signal powers in the sine axis and the cosine axis of the DL signal.

[Math 1]

$$\text{Average Level of Power} = \sqrt{I^2 + Q^2} \quad \text{(Equation 1)}$$

Calculation of the average values of power is performed at least when the signal processing apparatus 100 performs a calibration operation. The calibration operation will be described later.

The CAL-TRX 102 generates a DL calibration signal based on the result of operation by the DL signal monitoring unit 101. The CAL-TRX 102 inputs the DL calibration signal to the distortion compensation unit 103 at the time of a calibration operation.

The DL signal and the DL calibration signal that have been received are input to the distortion compensation unit 103, and the distortion compensation unit 103 in turn executes distortion compensation processing in which nonlinear distortion generated by the amplifier 104 and the memory effect are compensated for each signal. It is assumed that the distortion compensation processing is executed by means of DPD (Digital Pre-Distortion). The DL calibration signal executes DPD compensation processing in the distortion compensation unit 103 using a LUT (Look-Up Table) stored therein. The DL calibration signal output from the distortion compensation unit 103 is input to the amplifier 104.

More specifically, the distortion compensation unit 103 executes processing of equalizing a signal output from the amplifier 104 with the signal input to the DPD (Digital Pre-Distortion) in order to reduce influences of the non-linear distortion and the memory effect of the amplifier 104 on the input signal. In the DPD, DPD compensation coefficients are stored for distortion compensation with respect to amplitudes and phases. The distortion compensation unit 103 executes the DPD compensation processing on the input signal using a selected DPD compensation coefficient. For example, the distortion compensation unit 103 stores a LUT in which IQ (In-phase/Quadrature-phase) values of the input signal and the DPD compensation coefficients associated with the IQ values are associated with each other. The distortion compensation unit 103 determines the value of the input signal and executes the DPD compensation processing. In the DPD compensation processing, the DPD compensation coefficient is appropriately updated. The DPD compensation coefficient is a coefficient for compensating non-linear AM-AM/AM-PM (Amplitude Modulation-Phase Modulation) that cause the non-linear distortion of the amplifier 104. The distortion compensation unit 103 selects a DPD compensation coefficient, which is appropriate for an amplitude and a phase, based on a characteristic of the input signal.

The amplifier 104 amplifies and outputs the DL signal and the DL calibration signal, both of which have been input by the distortion compensation unit 103. The DL calibration signal output from the amplifier 104 is input to the CAL-TRX 102, and a DL-CAL is calculated by comparing the DL calibration signal input to the distortion compensation unit 103 with the DL calibration signal output from the amplifier 104. Note that it is assumed here that the average value of power of the DL calibration signal to be input to the distortion compensation unit 103 is a signal acquired by calculation on the basis of the average value of power received from the DL signal monitoring unit 101 in such a way that the average value of power of the DL calibration signal is equal to the average value of power of the DL signal.

As the result of the processing described above, the influences of the non-linear distortion and the memory effect of the amplifier 104 on the DL signal and the DL calibration signal will be at the same level, and the influences of the non-linear distortion and the memory effect can be reduced using the same DPD compensation coefficient.

Figure 3:
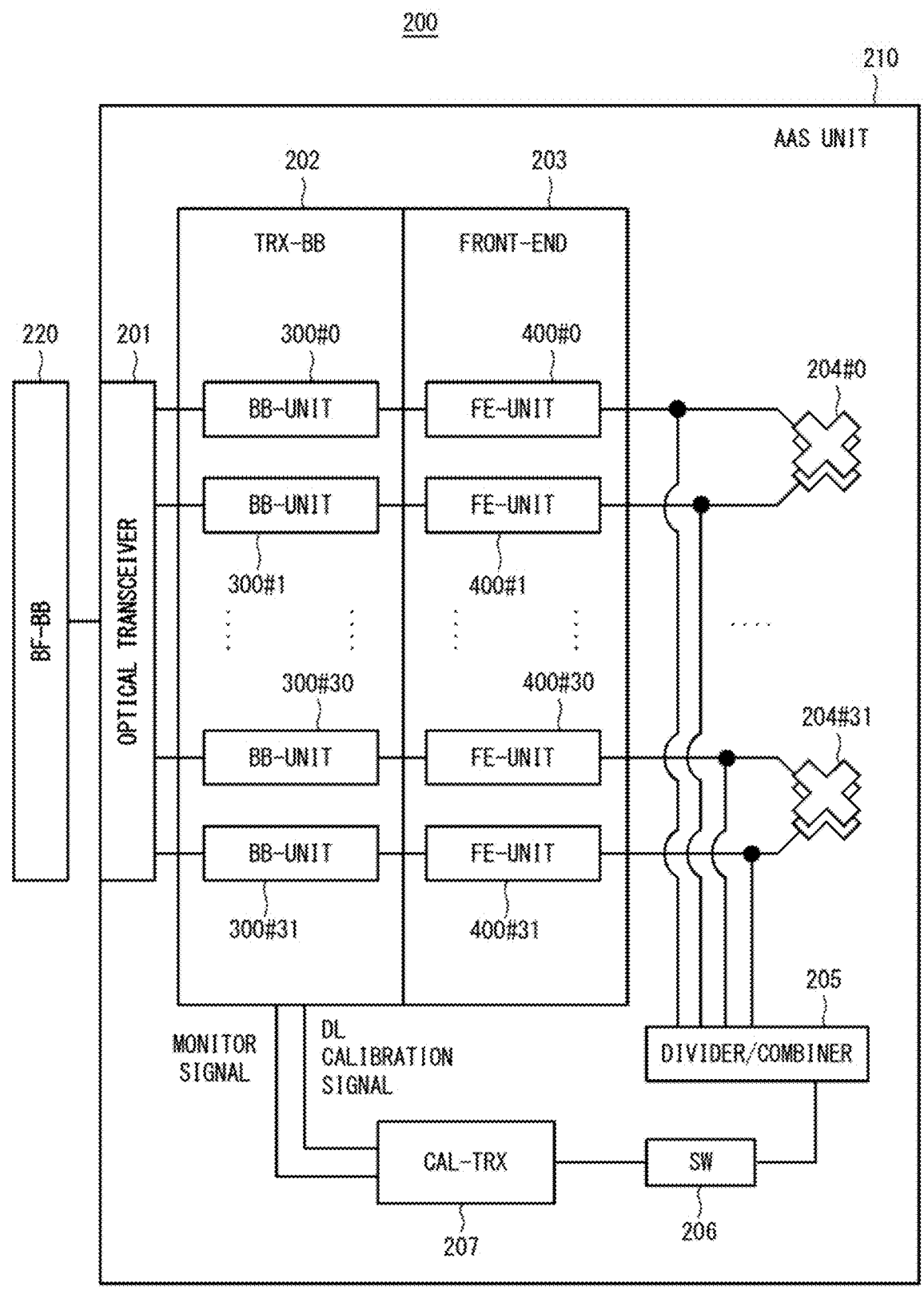
FIG. 3 is a block diagram illustrating a configuration of a radio communication apparatus according to the second example embodiment of the present disclosure.

A radio communication apparatus 200 according to the present example embodiment is described here with reference to FIG. 3. FIG. 3 is a block diagram illustrating a configuration of the radio communication apparatus 200 according to the present example embodiment. The radio communication apparatus 200 is an example of employing the signal processing apparatus 100 illustrated in FIG. 2 as the radio communication apparatus 200.

The radio communication apparatus 200 is equipped with a massive-element AAS (Active Antenna System) for 5G, and it is provided, for example, in base station equipment. As illustrated in FIG. 3, the radio communication apparatus 200 includes a BF-BB unit 220 and an AAS unit 210.

The AAS unit 210 includes an optical transceiver 201, a TRX-BB unit 202, a front-end unit 203, 32 antennas 204 each including a transceiver, a divider/combiner 205, a SW (Switch) 206, and a CAL-TRX (transceiver for calibration) 207. Although it is assumed in the present example embodiment, that the antenna 204 contains 32 antennas and a transceiver, different numbers of the antennas 204 and different numbers of the transceivers may be combined and arranged differently. The AAS unit 210 may also include a control unit (not illustrated) for controlling these units. Uplink (UL) to be described below means a communication channel from a UE (User Equipment), which is not illustrated, to the radio communication apparatus 200 while downlink (DL) means a communication channel from the radio communication apparatus 200 to the UE.

The BF-BB unit 220 is a base band unit having a function of generating a signal by means of beamforming. The BF-BB unit 220 stores preset reception characteristics [CAL-RX (fixed)] therein. The BF-BB unit 220 also stores therein characteristics TX #n*[CAL-RX] of each signaling channel acquired by an operation of the TRX-BB unit 202 when the radio communication apparatus 200 is activated or on a periodic basis, and updates the characteristics every time a new value is acquired. The BF-BB unit 220 uses these values to perform communication in the DL direction by outputting a communication signal for communication to the AAS 210.

Next, each of the units included in the AAS unit 210 is described. The optical transceiver 201 performs photoelectric conversion and the reverse conversion of signals (e.g., a multilayer signal) transmitted and received between the BF-BB unit 220 and the TRX-BB unit 202. The TRX-BB unit 202 mediates the communication signals transmitted and received between the optical transceiver 201 and the front-end unit 203.

The TRX-BB unit 202 generates the DL calibration signal, which is an IQ signal, at the time of a DL calibration operation, and outputs the DL calibration signal through the front-end unit 203, the divider/combiner 205, and the SW 206 to the CAL-TRX 207. In addition, the TRX-BB unit 202 generates a UL calibration signal, which is an IQ signal, at the time of an UL calibration operation, and outputs the UL calibration signal directly to the CAL-TRX 207. Thus, the TRX-BB unit 202 serves as a transceiver base band unit.

The TRX-BB unit 202 is a unit that mediates the communication signals transmitted and received between the optical transceiver 201 and the front-end unit 203, and includes 32 BB units 300 #0 to #31. Hereinafter, when it is not necessary to distinguish the BB units 300 #0 to #31, they are simply denoted as the BB unit 300.

The TRX-BB unit 202 determines a calibration weight (hereinafter referred to as a CAL weight) for the DL signal or a UL signal, i.e., the input signal, by performing the DL calibration operation or the UL calibration operation when the radio communication apparatus 200 is activated or on a periodic basis, and stores the calibration weight. The DL-CAL/UL-CAL weight are values for correcting variations in amplitudes and phases of TXs/RXs to be described later, and are determined by the DL/UL calibration operation based on the DL/UL-CAL signal.

When the radio communication apparatus 200 transmits a multilayer spatially multiplexed signal by means of data beamforming, the beam of a radio wave output by the radio communication apparatus 200 to a UE with which the radio communication apparatus 200 communicates may interfere with the other UE with which the radio communication apparatus 200 does not communicate; it is therefore preferable to reduce the interference. Thus, when the radio communication apparatus 200 generates a beam pattern for transmitting data in a direction of a UE and radiates a beam, a null is formed in the beam pattern to be radiated in a direction of the other UE. The DL calibration is performed in order to achieve a desired angle and a desired depth for the null.

When the TRX-BB unit 202 performs the DL calibration, the TRX-BB unit 202 generates the DL calibration signal and transmits the DL calibration signal through the front-end unit 203, the divider/combiner 205, and the SW 206 to the CAL-TRX 207. The CAL-TRX 207 outputs the DL calibration signal that has passed through the inside to the TRX-BB unit 202. The TRX-BB unit 202 measures differences in amplitudes and phases between the original DL calibration signal and the DL calibration signal received by the CAL-TRX 207 and determines the DL-CAL weight to be applied to each signaling channel for inversely correcting the differences.

When the TRX-BB unit 202 performs the UL calibration, the TRX-BB unit 202 generates the UL-CAL signal, and inputs the UL-CAL signal to the CAL-TRX 207. The CAL-TRX 207 inputs the UL-CAL signal that has passed through the CAL network to an FE unit 400 through the SW 206 and the divider/combiner 205. The receiver RX inputs the UL-CAL signal to the TRX-BB unit 202. The TRX-BB unit 202 measures differences in amplitudes and phases between the original UL-CAL signal and the UL-CAL signal transmitted by the CAL-TRX 207. The TRX-BB unit 202 determines the UL-CAL weight to be applied to a receiver RX of a TRX 401 of each FE unit 400 for performing inverse correction using the differences in amplitudes and phases. In this way, the TRX-BB unit 202 serves as a transceiver base band unit.

The front-end unit 203 includes 32 FE units 400 #0 to #31. Hereinafter, when it is not necessary to distinguish the FE units 400 #0 to #31, they are simply denoted as the FE unit 400.

The antenna 204 is an antenna provided for each TRX 401, each transmitting amplifier 402, and each receiving amplifier 406. The antenna 204 is a dual-polarized antenna for a +450 polarized wave and a −45° polarized wave, which are orthogonal to each other, and includes four units of eight antennas, i.e., 32 antennas in total. In this case, each single antenna element is dual-polarized, which means that the number of antennas is equivalent to 64. Each antenna 204 transmits an RF signal received from each FE unit 400 to one or more UEs by means of a radio signal. Note that at least one of a filter and a duplexer may be provided at the preceding stage of each antenna 204.

When the radio communication apparatus 200 performs the DL calibration, the divider/combiner 205 combines DL-CAL signals output from respective SWs 404 and outputs the resultant DL-CAL signal after combination to the SW 206. When the UL calibration is performed, the divider/combiner 205 divides a UL-CAL signal output from the SW 206 and outputs the resultant UL-CAL signals after division to respective SWs 404.

The SW 206 is a switch for switching a direction of a signal. When the radio communication apparatus 200 performs the DL calibration, the SW 206 cause the DL-CAL signal output from the divider/combiner 205 to be output to the SW 206. When the radio communication apparatus 200 performs the UL calibration, the SW 206 cause the UL-CAL signals output from the SW 206 to be output to the divider/combiner 205.

When the radio communication apparatus 200 performs the DL calibration, the CAL-TRX 207 converts the DL-CAL signal (RF signal) output from the SW 206 into a DL-CAL signal (IQ signal). The CAL-TRX 207 then outputs the DL-CAL signal after conversion to the TRX-BB unit 202.

When the radio communication apparatus 200 performs the UL calibration, the CAL-TRX 207 converts the UL-CAL signal (IQ signal) output from the TRX-BB unit 202 into a UL-CAL signal (RF signal) and outputs the UL-CAL signal after conversion to the SW 206. Note that the CAL-TRX 207 may include a transmitter and a receiver (both of which are not illustrated) similarly to the TRX 401.

Figure 4:
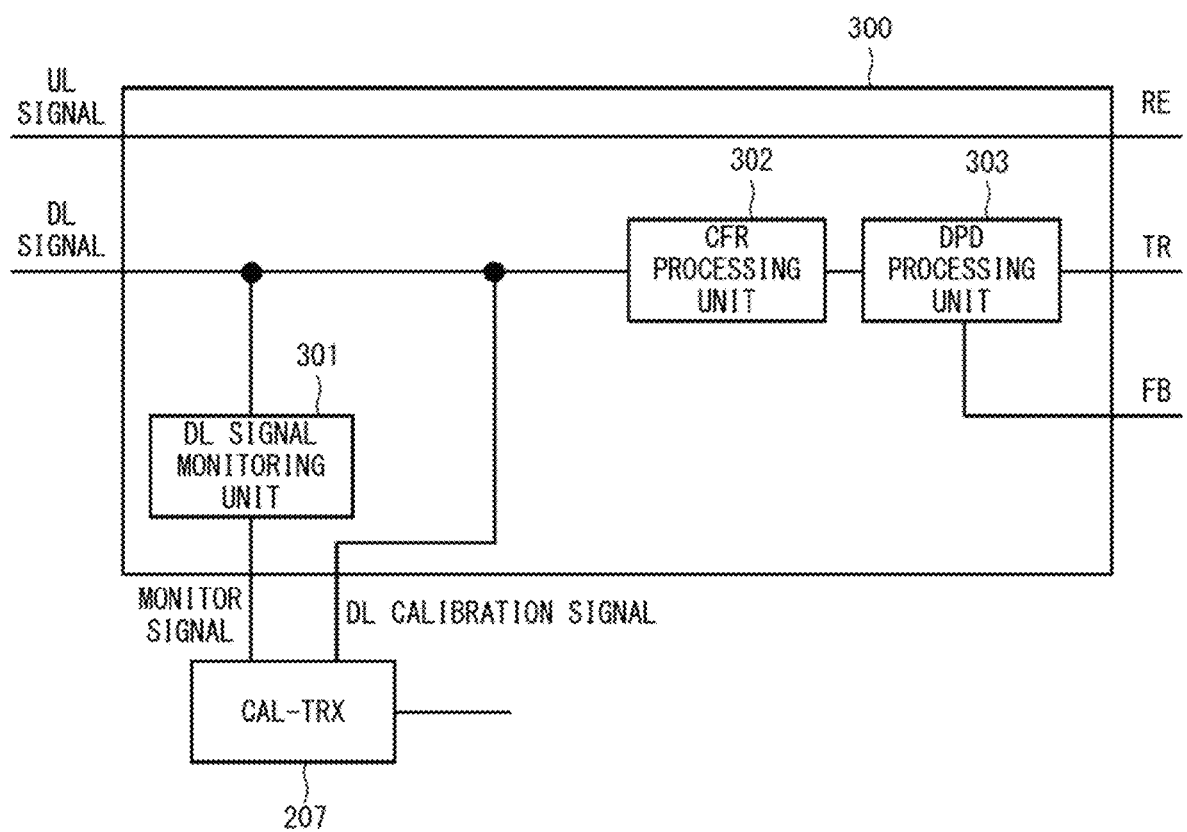
FIG. 4 is a block diagram illustrating a configuration of a BB unit according to the second example embodiment of the present disclosure.

A configuration of the BB unit 300 is described here with reference to FIG. 4. FIG. 4 is a block diagram illustrating the configuration of the BB unit 300 according to the present example embodiment.

The BB unit 300 includes a DL signal monitoring unit 301, a CFR processing unit 302, and a DPD processing unit 303. Each of the BB units 300 #0 to #31 has the same configuration as the BB unit 300 illustrated in FIG. 4.

The CFR processing unit 302 limits an IQ signal (multilayer signal) that has been output from the BF-BB unit 220 and input to the CFR processing unit 302 through the optical transceiver 201 by means of a CFR threshold value, which is a threshold value for suppressing a maximum power component of the IQ signal. Specifically, the CFR processing unit 302 suppresses an amplitude component of a signal, exceeding a peak level of the power set by the CFR threshold value, of the amplitude components of the multilayer signal input to the CFR processing unit 302 to a maximum power component less than the CFR threshold value and outputs the resultant signal to the DPD processing unit 303.

The reason for suppressing the peak level by the CFR processing unit 302 is as follows. If the peak level is not suppressed, a transmitted signal having a high peak level may be output to a transmitting amplifier 402 at the subsequent stage of the CFR processing unit 302. In this case, the signal is hard clipped at a saturated output level of the transmitting amplifier 402 and a high-order non-linear distortion component due to cross-modulation is generated; in this condition, the DPD processing unit 303 may not sufficiently compensate distortion of this non-linear distortion component. To prevent this condition, the CFR processing unit 302 limits the peak level of the transmitted signal to be input to the transmitting amplifier 402 and regulates the transmitted signal in such a way that the output level from the transmitting amplifier 402 does not exceed the saturated level.

Each DPD processing unit 303 is placed between the CFR processing unit 302 and the TRX 401. The DPD processing unit 303 compares the IQ signal (multilayer signal) output from the CFR processing unit 302 with an IR signal (multilayer signal) to which non-linear distortion based on the degree of non-linearity of the transmitting amplifier 402 has been added and that is returned via an FB (feedback) path.

The DPD processing unit 303 performs compensation for the input signal for inversely correcting the non-linearity by weighting based on the comparison in such a way that the non-linear distortion in the AM-AM/AM-PM input/output characteristics generated in the transmitting amplifier 402 is compensated.

The DPD processing unit 303 executes the DPD compensation processing to compensate the amplitude and the phase of the IQ signal for radio communication output from the CFR processing unit 302 according to the DPD compensation coefficient that represents a characteristic inverse to the input/output characteristics of the amplifier 302 at the subsequent stage, and outputs the signal acquired after the DPD compensation processing to the front-end unit 203 as a TR signal. Providing the DPD processing unit 303 for each TRX 401 enables the DPD compensation processing to be executed based on a characteristic of the individual TRX 401. The DPD compensation processing is executed in order to prevent radiation having non-linear distortion and improve performance of the DL signal in SINR (Signal to Interference and Noise Ratio). The DPD compensation processing may improve EVM (Error Vector Magnitude) and ACLR (Adjacent Channel Leakage Ratio) of the transmitting amplifier 402.

Figure 5:
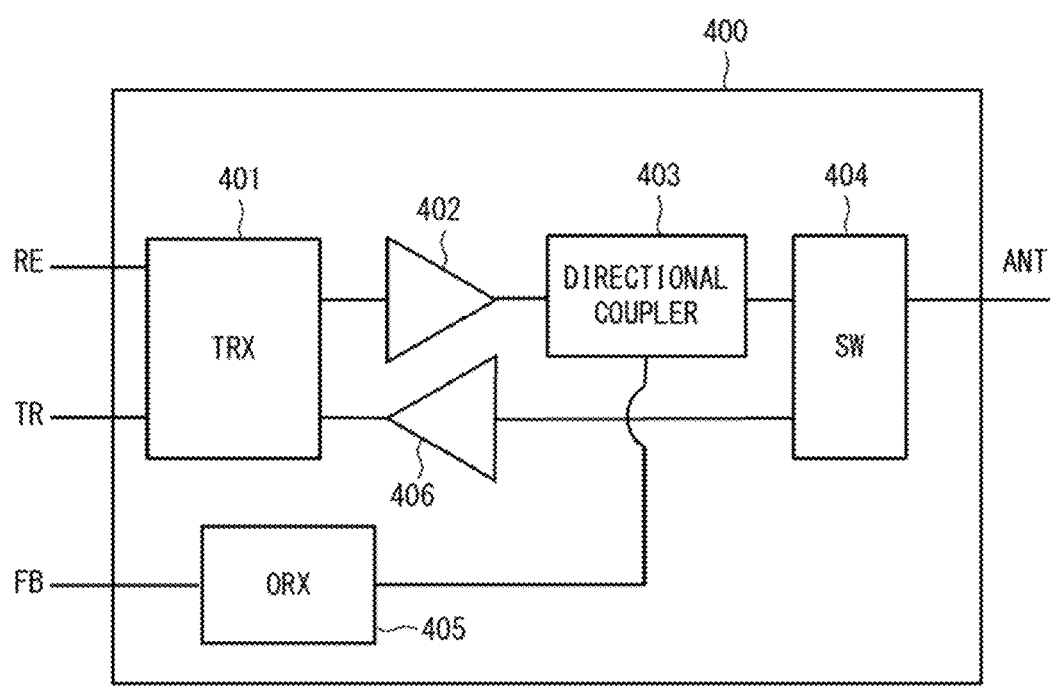
FIG. 5 is a block diagram illustrating a configuration of an FE unit according to the second example embodiment of the present disclosure.

A configuration of the FE unit 400 is described below with reference to FIG. 5. FIG. 5 is a block diagram illustrating the configuration of the FE unit 400 according to the present example embodiment.

The FE unit 400 includes the TRX 401, the transmitting amplifier 402, a directional coupler 403, a SW 404, an ORX (Observation Receiver) 405, and a receiving amplifier 406. Each of the FE units 400 #0 to #31 has the same configuration as the FE unit 400 illustrated in FIG. 5.

The TRX 401 is a transceiver and includes a transmitter TX and a receiver RX, both of which are not illustrated. The transmitter TX converts the IQ signal received from the TRX-BB unit 202 into an RF signal and outputs the RF signal to the antenna 204 or the CAL-TRX 207. When the radio communication apparatus 200 transmits a radio signal, the transmitter TX outputs the RF signal to the antenna 204; when the radio communication apparatus 200 performs the DL calibration, the transmitter TX outputs the DL-CAL signal (RF signal) to the CAL-TRX 207 through the divider/combiner 205.

The receiver TX converts the RF signal received from the antenna 204 or the CAL-TRX 207 into an IQ signal and outputs the IQ signal to the TRX-BB unit 202. When the radio communication apparatus 200 receives a radio signal from a UE, the TRX 401 receives the RF signal from the antenna 204. When the UL calibration is performed, the TRX 401 receives the UL-CAL signal (RF signal) from the CAL-TRX 207 through the divider/combiner 205. The TRX 401 then converts the received UL-CAL signal into a UL-CAL signal (IQ signal) and outputs the UL-CAL signal after conversion to the BF-BB unit 220 through the TRX-BB unit 202.

Each transmitting amplifier 402 is disposed between the antenna 204 and the TRX 401 provided for the associated antenna 204. The transmitting amplifier 402 amplifies the RF signal (signal for radio communication or the DL-CAL signal) output from the TRX 401 and outputs the RF signal to the directional coupler 403.

Each directional coupler 403 is a coupler placed between the transmitting amplifier 402 and the antenna 204. The directional coupler 403 outputs the RF signal output from each transmitting amplifier 402 to the antenna 204 and the associated ORX 405. The ORX 405 outputs the output RF signal to the DPD processing unit 303 via the FB path, and the DPD processing unit 303 receives the output RF signal and executes the processing described above.

The SW 404 is a switch for switching between a signal input to the TRX 401 and a signal output from the TRX 401 in accordance with a control signal from the control unit of the AAS unit 210. In other words, control made by the AAS unit 210 switches the connection destination of the front-end unit 203. Specifically, when the radio communication apparatus 200 is performing radio communication, the SW 404 is controlled in such a way that in each of signaling channels 0 to #31, the front-end unit 203 is connected to the antenna 204 while the front-end unit 203 is not connected to the CAL-TRX 207. In this way, the RF signal from the TRX 401 is output to the antenna 204 when transmitting data while the SW 404 causes the RF signal from the antenna 204 to be output to the TRX 401 when receiving data.

In contrast, when the radio communication apparatus 200 performs the DL/UL calibration, the SW 404 is controlled in such a way that in each signaling channel #0 to #31, the front-end unit 203 is connected to the CAL-TRX 207 while the front-end unit 203 is not connected to the antenna 204. In other words, while the TRX 401 and the divider/combiner 205 are connected, the antenna 204 and the TRX 401 are disconnected. When the radio communication apparatus 200 performs the DL calibration, the DL-CAL signal output from the transmitting amplifier 402 is input to the divider/combiner 205. When the radio communication apparatus 200 performs the UL calibration, the UL-CAL signal output from the divider/combiner 205 is input to the receiving amplifier 406.

The radio communication apparatus 200 prevents the DL/UL-CAL signal processed by each TRX 401 from being affected by interference of other systems by controlling each SW 404. In other words, the DL/UL-CAL signal processed by each TRX 401 will be free from a component caused by interference, and the AAS unit 210 can correctly determine the CAL weight to be applied to each TRX 401. When the DL/UL calibration is complete, the control unit of the AAS unit 210 controls each SW 404 in such a way that each TRX 401 is connected to the antenna 204.

The receiving amplifier 406 amplifies the input RF signal (signal for radio communication or the UL-CAL signal) and outputs the RF signal to the associated TRX 401.

<DL Calibration Operation>

The DL calibration operation performed by the radio communication apparatus 200 is described here.

First, the DL calibration operation is described. The TRX-BB unit 202 first outputs a preset DL-CAL signal (IQ signal) to the front-end unit 203. Each TRX 401 (transmitter TX thereof) in the front-end unit 203 converts the DL-CAL signal (IQ signal) into a DL-CAL signal (RF signal). The DL-CAL signals (RF signal) after conversion by respective TRX 401 are output to the divider/combiner 205 through the transmitting amplifier 402 and the SW 404, and the signals are combined by the divider/combiner 205. The resultant DL-CAL signal after combination by the divider/combiner 205 is input to the CAL-TRX 207 through the SW 206. Note that the AAS unit 210 may output the DL-CAL signal individually for each signaling channel at different timings.

The CAL-TRX 207 converts the received DL-CAL signal (RF signal) into a DL-CAL signal (IQ signal) and outputs the DL-CAL signal (IQ signal) to the TRX-BB unit 202. The DL-CAL signal transmitted from the CAL-TRX 207 is in a condition in which the DL-CAL signals transmitted from respective TRXs 401 #n are combined by means of frequency multiplexing. Therefore, the TRX-BB unit 202 divides the DL-CAL signal transmitted from the CAL-TRX 207 by means of frequency separation using FFT (Fast Fourier Transform). In addition, the TRX-BB unit 202 extracts a DL-CAL signal and calculates a DL-CAL weight for each signaling channel #0 to #31.

Specifically, the TRX-BB unit 202 measures differences in amplitudes and phases between the DL-CAL signal for each signaling channel of the transmitted DL-CAL signals and the original (i.e., before transmission) DL-CAL signal and learns variations in the amplitude and the phase of the DL-CAL signal for each signaling channel. The TRX-BB unit 202 calculates, based on the result of learning, the DL-CAL weight for each TRX 401 #n.

The DL-CAL weight for each TRX 401 #n is, as indicated in equation 2 below, acquired by multiplying transmission characteristics (characteristics of the amplitude and the phase) [TX #n] of the TRX 401 #n by reception characteristics (characteristics of the amplitude and the phase) [CAL-RX] of the CAL-TRX 207.

[Math 2]

$$\text{DL Calibration Weight } [TX\,\#n] \times [CAL\text{-}RX] \qquad \text{(Equation 2)}$$

Learning in the DL calibration is complete by executing the processing described above. The BF-BB unit 220 stores the DL-CAL weights therein.

From this point, when performing radio communication according to the normal DL, the BF-BB unit 220 outputs, to each TRX 401, the DL signal weighted using the aforementioned DL-CAL weight for the each TRX 401.

<Example of DL Operation>

Next, an example of the DL operation performed by the AAS unit 210 is described. The BF-BB unit 220 generates a BF signal (IQ signal) with the internal circuit. The BF-BB unit 220 then compensates the generated BF signal using the aforementioned DL-CAL weight for each signaling channel #0 to #31 and outputs the resultant BF signal to the TRX-BB unit 202 through the optical transceiver 201. Note that the AAS unit 210 may have a configuration in which the optical transceiver 201 is not provided between the BF-BB unit 220 and the TRX-BB unit 202, thereby causing the BF-BB unit 220 to be directly connected to the TRX-BB unit 202. In this case, the BF-BB unit 220 is configured to be connected to an external DU (Distribution Unit) through an optical transceiver 201.

Specifically, the BF-BB unit 220 multiplies the BF signal by a fraction having the DL-CAL weight as a denominator and fixed reception characteristics of the CAL-TRX 207 [CAL-RX (fixed)] as a numerator. The BF signal after correction is represented by equation 3 below. Note that [CAL-RX (fixed)] is stored in advance in a storage unit (not illustrated) of the BF-BB unit 220.

[Math 3]

$$BF \times \frac{[CAL\text{-}RX\,(\text{FIXED})]}{[TX\,\#n] \times [CAL\text{-}RX]} \qquad \text{(Equation 3)}$$

The BF signal after correction is converted by each TRX 401 #n of the TRX-BB unit 202 from the IQ signal to an RF signal and transmitted, amplified by each transmitting amplifier 402 #n, and output from the front-end unit 203. The BF signal output from the front-end unit 203 passes through each TRX 401 #n, and is represented by equation 4 below.

[Math 4]

$$BF \times \frac{[CAL\text{-}RX\,(\text{FIXED})]}{[TX\,\#n] \times [CAL\text{-}RX]} \times [TX\,\#n] \qquad \text{(Equation 4)}$$

By eliminating [TX #n], equation 4 is simply expressed as equation 5 below.

[Math 5]

$$BF \times \frac{[CAL\text{-}RX\,(\text{FIXED})]}{[CAL\text{-}RX]} \qquad \text{(Equation 5)}$$

In equation 5, if [CAL-RX (fixed)]=[CAL-RX], the BF signal is in an ideal condition, and the BF signal in the ideal condition is transmitted from each antenna 204 #n. Note that in order to make [CAL-RX (fixed)]=[CAL-RX] true, stability of CAL-RX is important.

By performing operations described above, it is possible to compensate variations in determining amplitudes and phases of each transmitter TX #n. With this DL calibration operation, when transmitting a multilayer spatially multiplexed radio signal by means of data beamforming, an angle and a depth of a null formed in a direction of another UE can be accurately set. In addition, it is possible to reduce radiation having non-linear distortion caused by third-order intermodulation distortion in each direction in space.

Note that update of the aforementioned DL-CAL weight may be performed, as will be described later, between transmission of a radio signal by means of fan beamforming (a beam pattern equivalent to that of omni-directional broad beamforming) and transmission of a radio signal by means of data beamforming. Update of the DL-CAL weight may be performed on a periodic basis. In addition, the radio communication apparatus 200 may perform update of the DL-CAL weight triggered by detecting that an environmental change (e.g., change in temperature) or a temporal change in a signal is generated with a sensor of the radio communication apparatus 200. In this case, the update period may be, but not limited to, one minute or longer.

<UL Calibration Operation>

Next, the UL calibration operation in a case in which a UL signal is the input signal is described. The TRX-BB unit 202 directly outputs a preset UL-CAL signal (IQ signal) to the CAL-TRX 207. The CAL-TRX 207 converts the UL-CAL signal (IQ signal) into a UL-CAL signal (RF signal). The UL-CAL signal (RF signal) after conversion by the CAL-TRX 207 is output to the divider/combiner 205 through the SW 206, and the signal is divided by the divider/combiner 205. Each of the resultant UL-CAL signals after division by the divider/combiner 205 is output to the TRX 401 through the SW 404 and the receiving amplifier 406. Each TRX 401 converts the UL-CAL signal (RF signal) into a UL-CAL signal (IQ signal) and outputs the UL-CAL signal (IQ signal) to the TRX-BB unit 202.

The TRX-BB unit 202 measures differences in amplitudes and phases between a UL-CAL signal of the UL-CAL signals received by the TRXs 401 and the original UL-CAL signal and learns variations in the amplitude and the phase of the UL-CAL signal. The TRX-BB unit 202 calculates, based on the result of learning, the UL-CAL weight for each TRX 401.

The UL calibration operation is complete by executing the processing described above. The BF-BB unit 220 stores the UL-CAL weight therein. From this point, when performing radio communication according to the normal UL, the BF-BB unit 220 outputs, to each TRX 401, the UL signal weighted using the aforementioned UL-CAL weight for the each TRX 401.

<Execution Timing for Calibration>

Next, execution timings for the DL calibration and the UL calibration are described. As described above, the radio communication apparatus 200 may be a radio communication apparatus that performs radio communication by means of the TDD (Time Division Duplex) mode. The TDD mode is a communication method for performing transmission and reception by temporally switching between DL communication and UL communication using the same frequency for UL and DL. In DL communication, DL subframes are transmitted while in UL communication, UL subframes are transmitted. At a timing for switching from DL communication to UL communication, special subframes are transmitted. Special subframes are subframes consisting of DwPTS (Downlink Pilot Time Slot), UpPTS (Uplink Pilot Time Slot), and GP (Guard Period). DwPTS is a field reserved for DL communication, UpPTS is a field reserved for UL communication, and GP is a field where no DL communication nor UL communication is performed.

In the radio communication apparatus 200, in a time period for GP (Guard Period) where no DL communication nor UL communication is performed, the transmitter TX and the receiver RX of the TRX 401 are exclusively in the OFF state and the ON state, respectively. The radio communication apparatus 200 performs, for example, at least one of the DL calibration and the UL calibration in a time period for GP of a special subframe.

Figure 6:
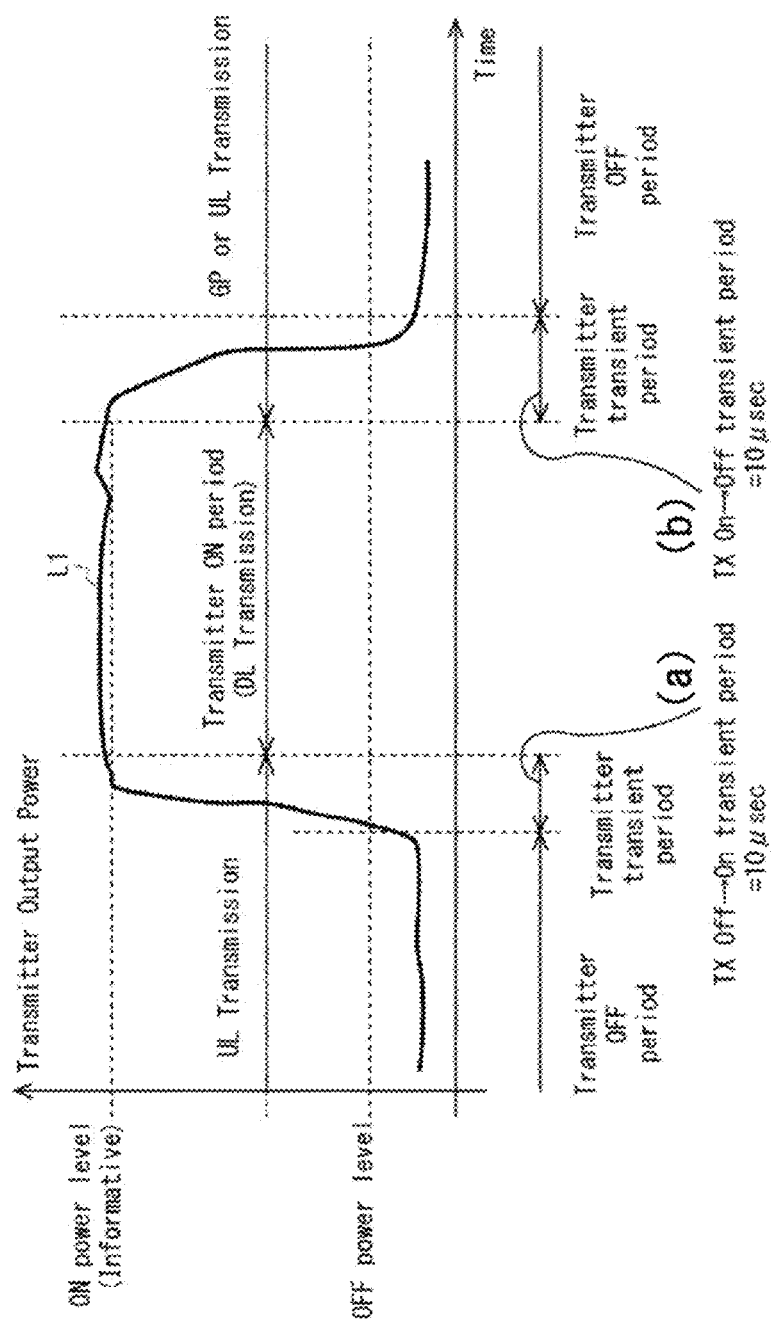
FIG. 6 is a diagram illustrating power levels of the radio communication apparatus according to the second example embodiment of the present disclosure at timings in DL and UL.

Power levels of the transmitter when performing calibration is described here with reference to FIG. 6. FIG. 6 is a diagram illustrating power levels of the radio communication apparatus 200 at timings in DL and UL. The horizontal axis in FIG. 6 indicates time while the vertical axis indicates the power levels. The solid line L1 in FIG. 6 represents transition of a transmission power level of the transmitter TX of the radio communication apparatus 200.

It is understood from FIG. 6 that the transmission power level, which is at the OFF power level in the initial transmitter OFF period, reaches, after experiencing a transmitter transient period, the ON power level in the transmitter ON period, and decreases, after experiencing another transmitter transient period, to the OFF power level in the transmitter OFF period.

In FIG. 6, the time period denoted as UL transmission indicates a time period for UL communication. The time period denoted as DL transmission indicates a time period for DL communication. The time period denoted as GP or UL transmission indicates a time period for GP or UL communication.

The radio communication apparatus 200 performs the DL calibration or the UL calibration in a time period (transmitter transient period) for GP of a special subframe. This time period is included in an uplink-downlink frame timing period. As illustrated in FIG. 6, within a GP, the time period (a) in FIG. 6 where the transmitter TX transitions from the OFF state to the ON state and the time period (b) in FIG. 6 where the transmitter TX transitions from the ON state to the OFF state are, for example, 10 μs. The radio communication apparatus 200 can perform the DL calibration or the UL calibration described above in at least one of the time periods (a) and (b) in FIG. 6. In other words, in this example, the time for outputting the DL/UL-CAL signal may be 10 μs or less. The main object of calibration is to unify frequency characteristics of amplitudes and phases of 32 TRXs 401 in a linear region. Therefore, it is important to reduce, in order to prevent non-linear degradation of the DL/UL-CAL signal, power of the DL/UL-CAL signal to maximum rating or less and to a level where necessary SNR (Signal-to-Noise Ratio) can be ensured. The DL-CAL weight that is a value for correcting variations in amplitudes and phases of TXs and RXs is calculated in this way in a time period for GP on a periodic basis, and stored in the BF-BB unit 220.

<Frequency arrangement in DL-CAL signal>

Frequency arrangement in the DL-CAL signal is described here. In this case, the frequency arrangement in the DL-CAL signal is described using an example in which frequencies are arranged orthogonally to each other with respect to each TRX #n. An example of the frequency arrangement in the DL-CAL signal is described for a case in which the transmitter TX #n is provided with 32 TRXs #n as illustrated in FIG. 3.

Figure 7:
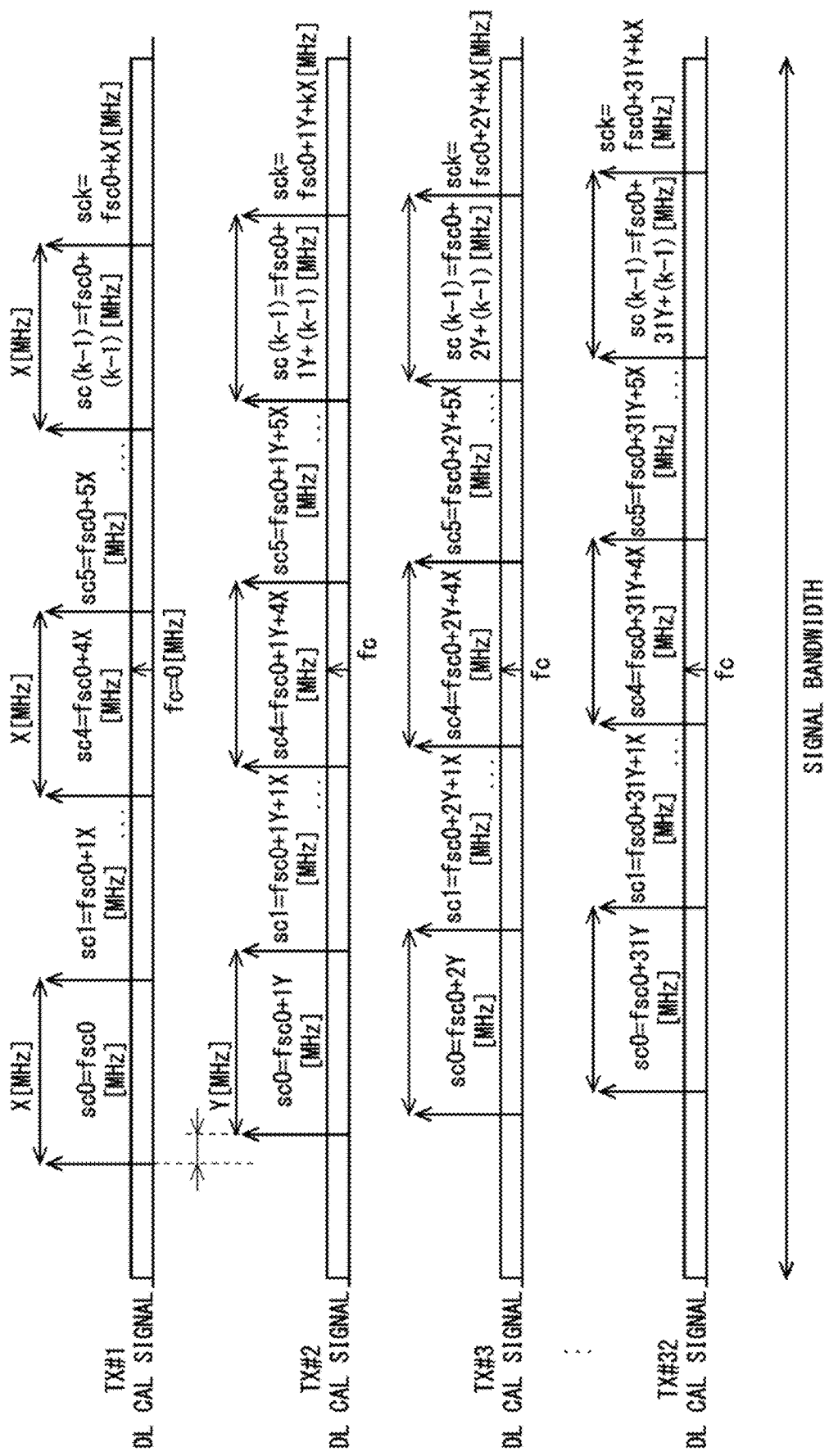
FIG. 7 is a diagram illustrating one example of frequency arrangement in DL-CAL signals according to the second example embodiment of the present disclosure.

With reference to FIG. 7, an example of the frequency arrangement in the DL-CAL signal for each transmitter TX #n is described. FIG. 7 is a diagram illustrating one example of frequency arrangement in the DL-CAL signals.

In FIG. 7, subcarriers used for transmitting a DL-CAL signal are arranged at an interval of X [MHz] in the frequency arrangement in the DL-CAL signal for a single transmitter TX #n. The frequencies arranged in the DL-CAL signals for adjacent transmitters TX #n are shifted in the frequency direction by Y [MHz]. fsc0 [MHz] is a frequency used as a reference.

In the example illustrated in FIG. 7, two conditions A1 and A2 described below for frequency arrangement need to be satisfied.

Condition A1 for the frequency arrangement: X [MHz]>Y [MHz]×(the number of transmitters TX #n minus 1) is satisfied.

Condition A2 for the frequency arrangement: The frequency "sco=fsc0 [MHz]" of a subcarrier sc0 having the lowest frequency in the DL-CAL signal for the transmitter TX #1 to the frequency "sick=fsc0+31Y+Ka [MHz]" of a subcarrier sock having the highest frequency in the DL-CAL signal for the transmitter TX #31 are within the bandwidth of the signal.

Problem in Related Art

Next, a problem in the related art is described. FIG. 8 illustrates an example of arrangement of antennas 204 #0 to #31 in the related art. The numbers denoted in FIG. 8 represent the number for the antenna 204; for example, "1" indicates that the antenna "#1" is disposed. In the example in FIG. 8, eight antennas 204 are arranged in four rows, and the antennas 204 disposed in the same row output the same radio signal. For example, four antennas included in each of (a1), (a2), (b1), (b2), (c1), (c2), (d1), and (d2) illustrated in FIG. 8 output the same radio signal. Consequently, strengths of radio waves from the four antennas in each of these rows are approximately equal.

The antennas 204 #0 to #31 can perform, for example, transmission of radio signals by means of fan beamforming and transmission of radio signals by means of data beamforming. The transmission of radio signals by means of fan beamforming means that radio signals having a substantially constant strength are transmitted from a front side of the radio communication apparatus 200 and in a horizontal direction within a range of predetermined angle from the front side, and such transmission of radio signals is performed, for example, in data transmission such as broadcasting. In contrast, the transmission of radio signals by means of data beamforming means that radio signals having a strong strength are transmitted from the front side of the radio communication apparatus 200 and in a horizontal direction within a range of a certain angle while in a direction of another UE, a null is formed and radio signals having a weak strength are transmitted. The latter method for transmitting radio signals is used for data communication with a specific UE.

When the antennas 204 #0 to #31 transmit radio signals by means of fan beamforming, the antennas (a1) and (a2), for example, output radio signals reaching the maximum rating while the antennas (b1) and (b2), the antennas (c1) and (c2), and the antennas (d1) and (d2) output radio signals having strengths of radio waves decreasing in this order. In other words, the strengths of the radio signals output from the antennas illustrated in FIG. 8 decrease as the antennas are located farther from the center. As an example, the BF-BB unit 220 outputs input signals of −14 dBFS (average) maximum to the transmitting amplifiers 402 associated with the antennas (a1) and (a2) and outputs input signals of −24 dBFS (average) maximum to the transmitting amplifiers 402 associated with the antennas (b1) and (b2).

Note that phases of the input signals for the transmitting amplifiers 402 associated with the antennas (a1) and (a2) and the transmitting amplifiers 402 associated with the antennas (c1) and (c2) are the same while phases of the input signals for the transmitting amplifiers 402 associated with the antennas (b1) and (b2) and the transmitting amplifiers 402 associated with the antennas (d1) and (d2) are opposite to the phases of the input signals for the transmitting amplifiers 402 associated with the antennas (a1) and (a2) and the transmitting amplifiers 402 associated with the antennas (c1) and (c2).

Figure 9:
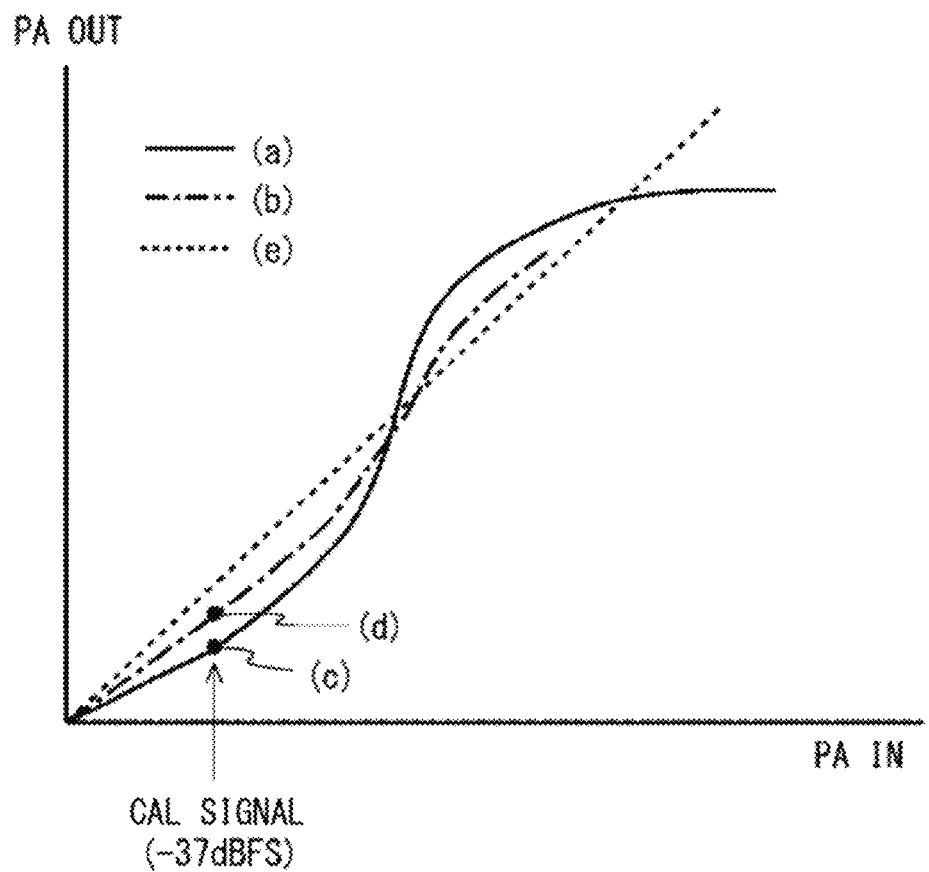
FIG. 9 is a diagram illustrating one example of AM-AM characteristics of associated transmitting amplifiers.

FIG. 9 is a graph illustrating one example of AM-AM input/output characteristics of the transmitting amplifiers 402 associated with (a1), (a2), (b1), and (b2) of the antennas 204 illustrated in FIG. 8. The horizontal axis in FIG. 9 indicates an amplitude of the input signal while the vertical axis in FIG. 9 indicates an amplitude of the output signal. The input/output characteristic of the transmitting amplifier 402 associated with the antennas (a1) and (a2) is represented by (a) in FIG. 9 while the input/output characteristic of the transmitting amplifier 402 associated with the antennas (b1) and (b2) is represented by (b) in FIG. 9. An ideal input/output characteristic of the transmitting amplifier 402 is linear and represented by (e) in FIG. 9. Note that the input/output characteristics (a) and (b) of the transmitting amplifiers 402 have not been compensated by the associated DPD processing units 303.

A case is considered here in which a memory effect is generated in the AM-AM characteristic and the AM-PM characteristic of the transmitting amplifier 402, in other words, there occurs a phenomenon in which the AM-AM characteristic and the AM-PM characteristic suffer from changes, based on the input/output levels of signals that have passed through the transmitting amplifier 402 in past time slots, and the changes hold for a certain period of time. In this case, when a signal of −37 dBFS (average) is input to the transmitting amplifier 402 as the DL-CAL signal, points (c) and (d) represent output signals corresponding to the input signals in the input/output characteristics (a) and (b).

As illustrated in FIG. 9, the input/output characteristics (a) and (b) are off the ideal input/output characteristic and have non-linearity. The input/output characteristic (a), in particular, has a greater degree of non-linearity than the input/output characteristic (b). Therefore, the DL-CAL signal having a small amplitude (strength) is input to the transmitting amplifiers 402 having the input/output characteristics (a) and (b).

The phase difference between the input signal and the output signal (AM-PM input/output characteristic) of the transmitting amplifier 402 has a significant difference from an ideal input/output characteristic (the characteristic with no phase difference), similarly to the AM-AM input/output characteristic. The difference increases in the order of (a1) and (a2), (b1) and (b2), (c1) and (c2), and (d1) and (d2).

It may be considered that the distortion due to non-linearity described above can be removed by compensating the input signal to the transmitting amplifier 402. However, when the transmitting amplifier 402 is, for example, a gallium nitride amplifier configured as a Doherty amplifier, a memory effect may be generated in the AM-AM input/output characteristic and the AM-PM input/output characteristic. In this case, there is such a problem that even though the input signal is modified and compensated, the transmitting amplifier 402 outputs, for a certain period of time, an output signal according to the input/output characteristic based on the input signal before compensation due to the memory effect generated therein.

In particular, when the DL calibration is performed after the radio communication apparatus 200 transmits a radio signal by means of fan beamforming and a radio signal is transmitted subsequently by means of data beamforming, the following problem occurs.

When the radio signal is transmitted by means of fan beamforming, the signal strength of the output from the transmitting amplifier 402 varies from the maximum rating to a weak strength. The distortion caused by the non-linearity of each transmitting amplifier 402 at this point is compensated by the associated DPD processing unit 303.

When the DL calibration is performed after the radio wave is radiated by means of data beamforming, output levels of the DL-CAL signal output by the BF-BB unit 220 at the transmitters TX will be substantially the same unlike in the case of fan beamforming. However, when the DL-CAL signal passes through the transmitting amplifier 402, because of the memory effect of the transmitting amplifier 402, the AM-AM characteristic and the AM-PM characteristic that depend on the input/output characteristic when fan beamforming is performed affects the DL-CAL signal output from each transmitter.

As an example, a signal having an average level of −37 dBFS is considered as the DL-CAL signal. Note that 0 dBFS is equivalent to a maximum output level of a transmitting DAC (Digital Analog Converter). As described above, when the DL-CAL signal is input to the transmitting amplifier 402 in a condition in which the memory effect is generated, points (c) and (d) respectively represent output signals corresponding to the input signal in the input/output characteristics (a) and (b) in FIG. 9. Therefore, a gain for the DL-CAL signal in a condition in which the memory effect is generated will be different compared to that for the ideal input/output characteristic. It is assumed here that at the time of the DL calibration operation using the DL-CAL signal, the radio communication apparatus 200 learns frequency characteristics of amplitudes and phases of respective transmitters in a linear region where non-linearity is not involved and correction is made while unifying differences among the frequency characteristics. Therefore, as the DPD processing unit 303 is being turned OFF, the distortion caused by the non-linearity of each transmitting amplifier 402 is not compensated by the associated DPD processing unit 303. Thus, at the time of the DL calibration operation, the DL-CAL weight is set in such a way that the differences in amplitudes and phases of transmitters TX caused by the memory effect are compensated.

When the radio communication apparatus 200 transmits a radio signal by means of data beamforming in the next data slot, output from each transmitting amplifier 402 will be set to the maximum rating in order to transmit data to a UE. In other words, the radio signals output by the BF-BB unit 220 for respective signaling channels have amplitudes approximately equal. When the radio signal is transmitted by means of data beamforming, since each DPD processing unit 303 is being turned ON, each DPD processing unit 303 tries to compensate the distortion caused by the non-linearity of the associated transmitting amplifier 402.

What has been set in the aforementioned DL calibration is, however, the DL-CAL weight that reflects the history of fan beamforming as described above. Therefore, although the output signals from respective transmitting amplifiers 402 are supposed to have approximately equal amplitudes, because of the unnecessary DL-CAL weight, the output signals from respective transmitting amplifiers 402 will have different amplitudes. In addition, phase differences, which are not supposed to exist, will be generated in respective transmitting amplifiers 402. Thus, overcompensation or undercompensation occurs for amplitudes and phases of radio signals by means of data beamforming. This phenomenon will continue until the DL-CAL weight is updated.

Figure 10:
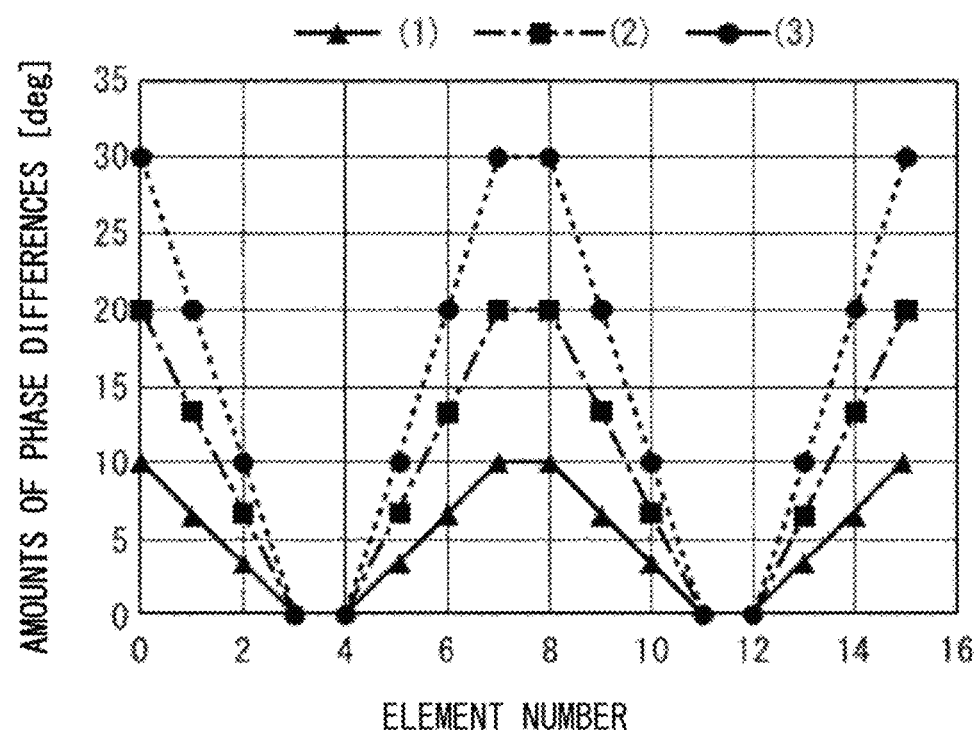
FIG. 10 is a diagram illustrating one example of phase differences among the associated antennas.

FIG. 10 is a diagram illustrating one example of phase differences among the antennas. The horizontal axis of the graph in FIG. 10 indicates the number for the transmitting amplifier 402 while the vertical axis of the graph indicates an amount of the phase difference from the phases of the transmitting amplifiers 402 #3, #4, #11, or #12 (associated with the antennas (a1) and (a2) in FIG. 8). In FIG. 10, the amount of phase differences between radio signals by means of data beamforming output by the transmitting amplifiers 402 are illustrated when the radio signals are transmitted by the antennas 204 having the configuration illustrated in FIG. 8 after compensation using the unnecessary DL-CAL weight in the processing described above. While the amounts of the phase differences of the transmitting amplifiers 402 #0 to #15 are illustrated in FIG. 10, the amounts of the phase differences of the transmitting amplifiers 402 #16 to #31 (the phase differences from the phases of the transmitting amplifiers 402 #19, #20, #27, or #28) will be represented by the same graph as illustrated in FIG. 10.

FIG. 10 illustrates three cases of phase differences between transmitters, which statistically fall within ±3σ with σ being a standard deviation, when the memory effect is generated, that is: (1) the phase differences are 11.6 degrees p-p (phase-phase) at maximum; (2) the phase differences are 23.1 degrees p-p at maximum; (3) the phase differences are 34.6 degrees p-p at maximum. Influences of these phase differences on data beamforming were verified using the following calculation. As illustrated in FIG. 9, the amounts of the phase differences of the transmitting amplifiers 402 associated with (d1) and (d2) of the antenna 204 in FIG. 8 are the greatest, and the amounts of the phase differences of the transmitting amplifiers 402 decrease in the order of the amplifiers associated with the antennas (c1) and (c2) and the amplifiers associated with the antennas (b1) and (b2).

Figure 11:
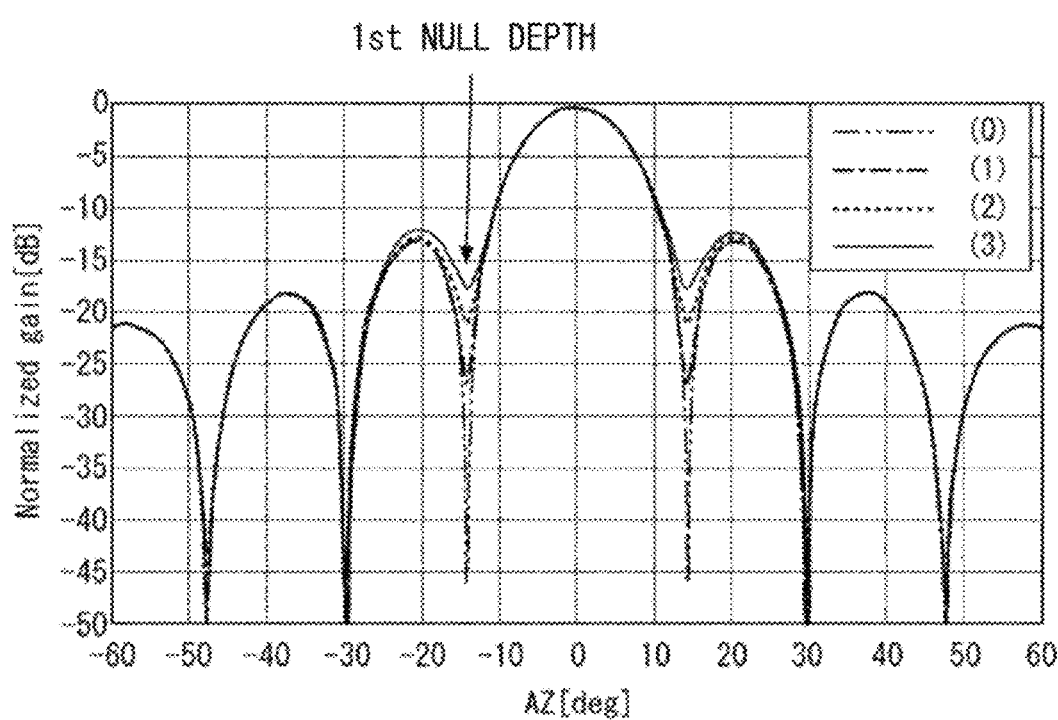
FIG. 11 is a diagram illustrating angular spectra of radiation patterns in a horizontal direction when associated radio signals are output by means of data beamforming.

FIG. 11 is a diagram illustrating angular spectra of radiation patterns in a horizontal direction when associated radio signals are output by means of data beamforming. The horizontal axis of the graph in FIG. 11 indicates angles in the horizontal direction (left-right direction) from the front side of the radio communication apparatus 200 while the vertical axis of the graph indicates normalized radiation power levels with the output signal from the front side of the radio communication apparatus 200 as a reference. In FIG. 11, graphs (1) to (3) represent angular spectra for the cases in FIG. 10 having the phase differences (1) to (3) while graph (0) in FIG. 11 represents angular spectra proper for a case in which the unnecessary DL-CAL weight is not used.

As can be understood by referring to FIG. 11, a depth of a null point located most closely to the front side of the radio communication apparatus 200 (first null depth) is 46 dB for the case (0), 27 dB for the case (1), 21 dB for the case (2), and 17 dB for the case (3). This means that the null depth will be smaller as the phase differences are greater. In other words, DL SINR in a direction of a UE will degrade when transmitting a spatially multiplexed signal due to this null having a small depth, that is, a wave interfering with beamforming toward other pieces of UE. The null depth determines performance of MU-MIMO of the radio communication apparatus 200. Therefore, throughput of cells when the radio communication apparatus 200 serves as a base station is not improved, and communication quality deteriorates.

A configuration of the radio communication apparatus 200 according to the present example embodiment is described, the configuration enabling SINR degradation generated when non-linear characteristics of the amplifier are subject to the memory effect to be reduced in such a way that accuracy of the calibration does not degrade due to the memory effect and SINR of signals to respective pieces of user equipment do not degrade when transmitting spatially multiplexed signals.

<Description of Operations of the Signal Processing Apparatus According to the Present Example Embodiment>

Operations of the signal processing apparatus 100 according to the present example embodiment are described here. The signal processing apparatus 100 reduces, when the non-linear distortion of the amplifier 104 and the memory effect are generated, the influence of these on the DL calibration signal by means of DPD.

Figure 12:
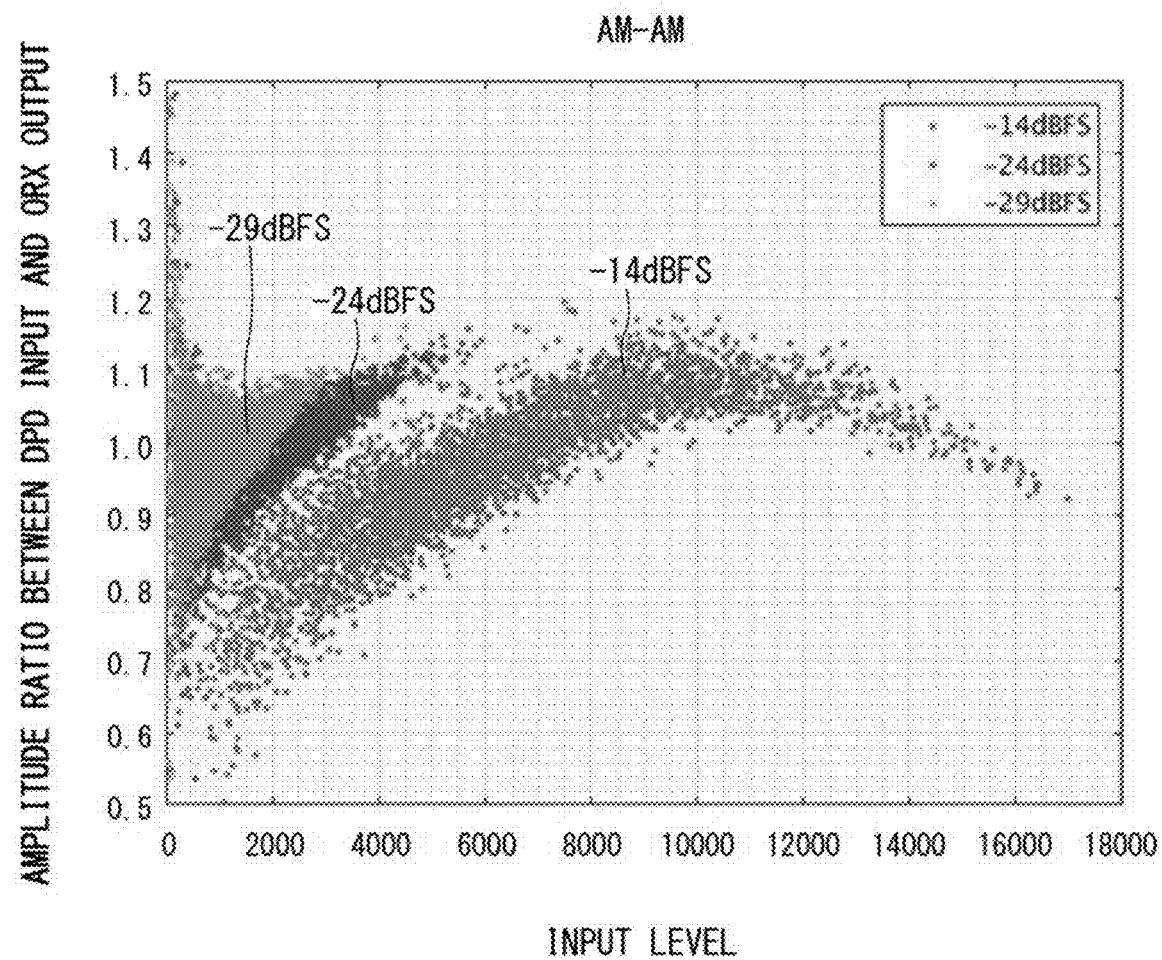
FIG. 12 is a diagram illustrating one example of AM-AM characteristics that the associated amplifiers give to signals.
Figure 13:
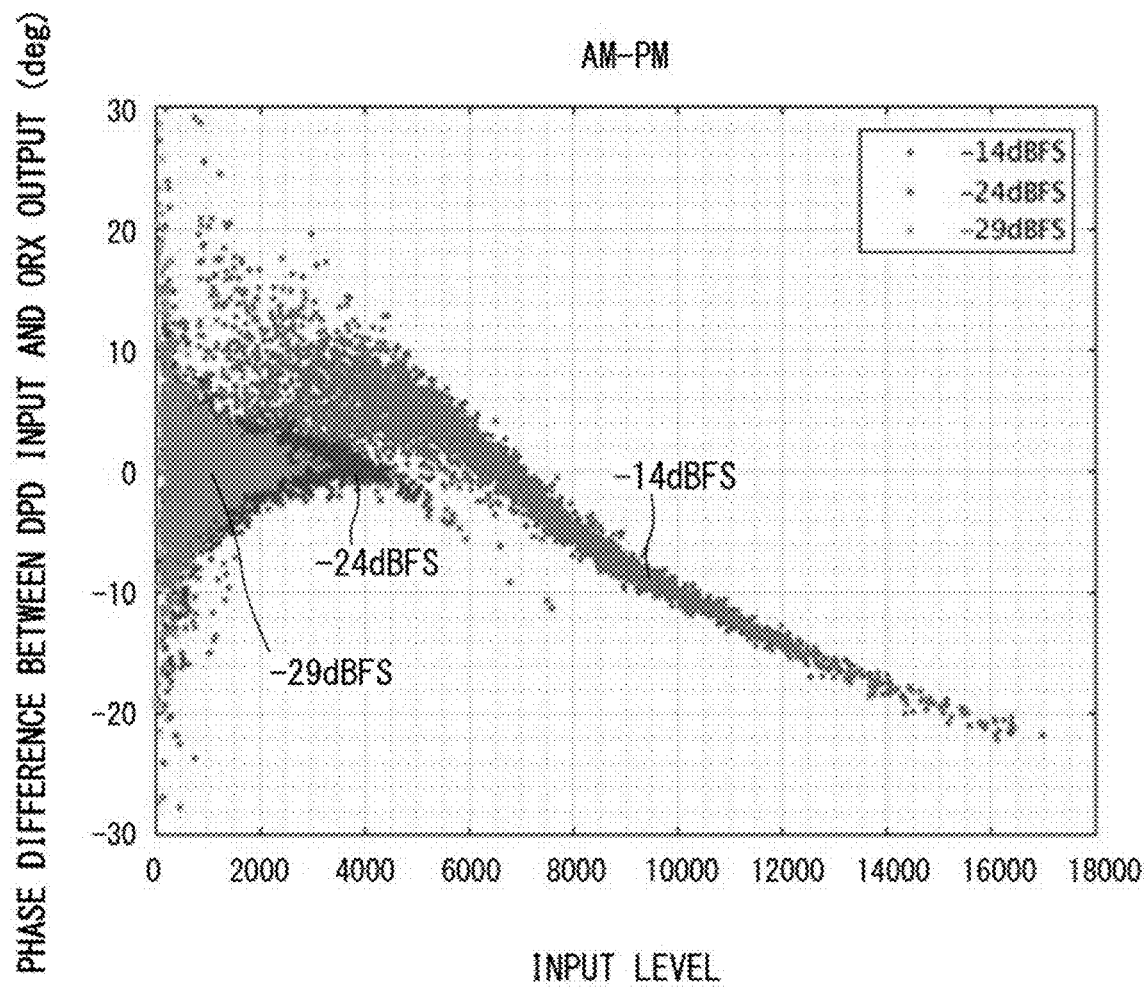
FIG. 13 is a diagram illustrating one example of AM-PM characteristics that the associated amplifiers give to signals.

The non-linear distortion and the memory effect given to input signals by the amplifier 104 are described with reference to FIG. 12 and FIG. 13. FIG. 12 is a diagram illustrating one example of AM-AM characteristics that the associated amplifiers give to signals. FIG. 13 is a diagram illustrating one example of AM-PM characteristics that the associated amplifiers give to signals.

The horizontal axis in FIG. 12 indicates an input level while the vertical axis indicates a value acquired by dividing an output level by the input level. Therefore, it is shown that as the value in the vertical axis is lower, the value acquired by amplification by the amplifier 104 is lower. The horizontal axis in FIG. 13 indicates an input level while the horizontal axis indicates a value acquired by subtracting a phase of the input signal from a phase of the output signal. Therefore, the DPD compensation coefficient varies depending on average levels of the DL signals input to the amplifier 104 and the average levels of the DL signals dynamically changes. Consequently, when the DL calibration signal is at a fixed level, compensation of the DL calibration signal by means of DPD cannot be performed, and accuracy of the calibration deteriorates. As illustrated in FIG. 12 and FIG. 13, the AM-AM characteristic and the AM-PM characteristic are different from each other because influences of the non-linear distortion and the memory effect are different depending on the average values of input power.

The average value of power is calculated by the DL signal monitoring unit 301 by inputting the DL signal to the DL signal monitoring unit 301. On the basis of the calculated average value of power, the DL calibration signal output from the CAL-TRX 207 is calculated in such a way that it is equal to the value received from the DL signal monitoring unit 301. Thus, the DL signal and the DL calibration signal have the same average value of power.

The CFR processing unit 302 limits the DL signal and the DL calibration signal that have been input by a threshold value set to a peak level, and inputs the resultant signals to the DPD processing unit 303. With respect to the DL signal and the DL calibration signal that have been input to the DPD processing unit 303, the distortion compensation processing is executed, the resultant signals are input to the TRX 401 and conversion from IQ signals to RF (Radio Frequency) signals is performed, and the resultant signals are input to the transmitting amplifier 402. The signals amplified by the transmitting amplifier 402 are input to the ORX 405 through the directional coupler 403 and fed back to the DPD processing unit 303. The DPD processing unit 303 calculates the DPD compensation coefficient for reducing the influences of the non-linear distortion and the memory effect of the transmitting amplifier 402 based on the DL signal and the DL calibration signal that have been fed back, and performs compensation for the DL signal and the DL calibration signal.

Figure 14:
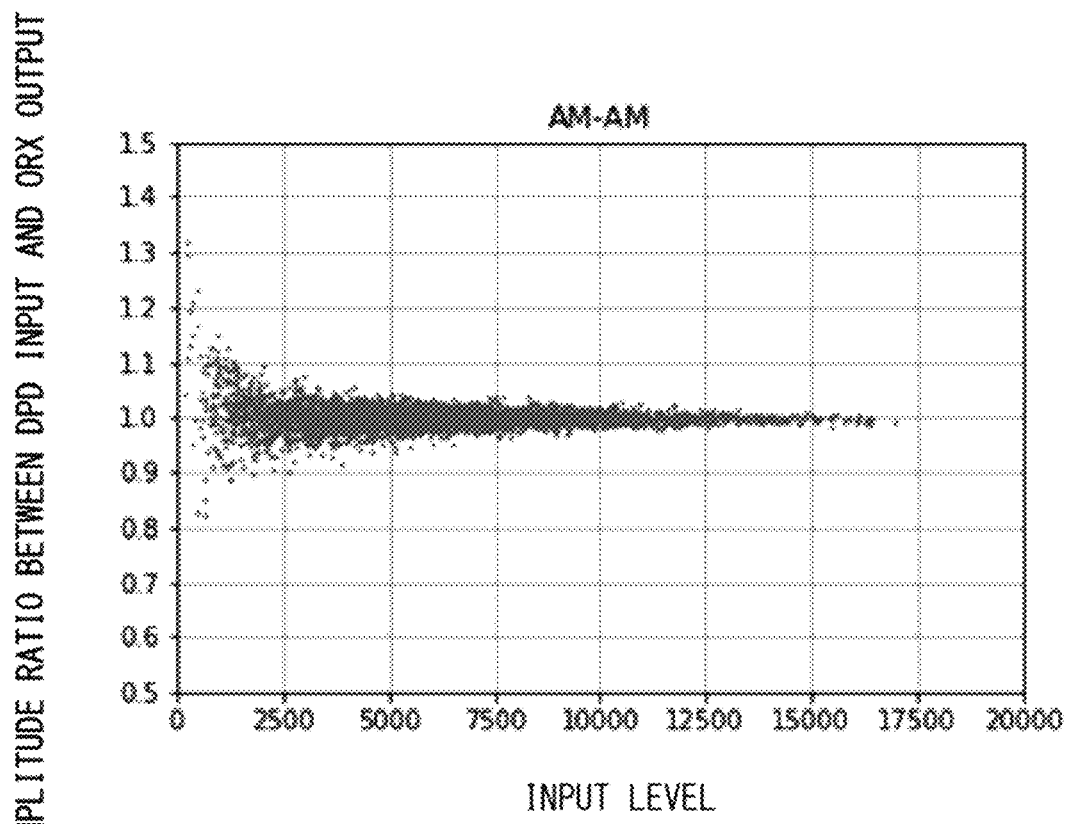
FIG. 14 is a diagram illustrating one example of AM-AM characteristics after DPD compensation processing according to the second example embodiment of the present disclosure.
Figure 15:
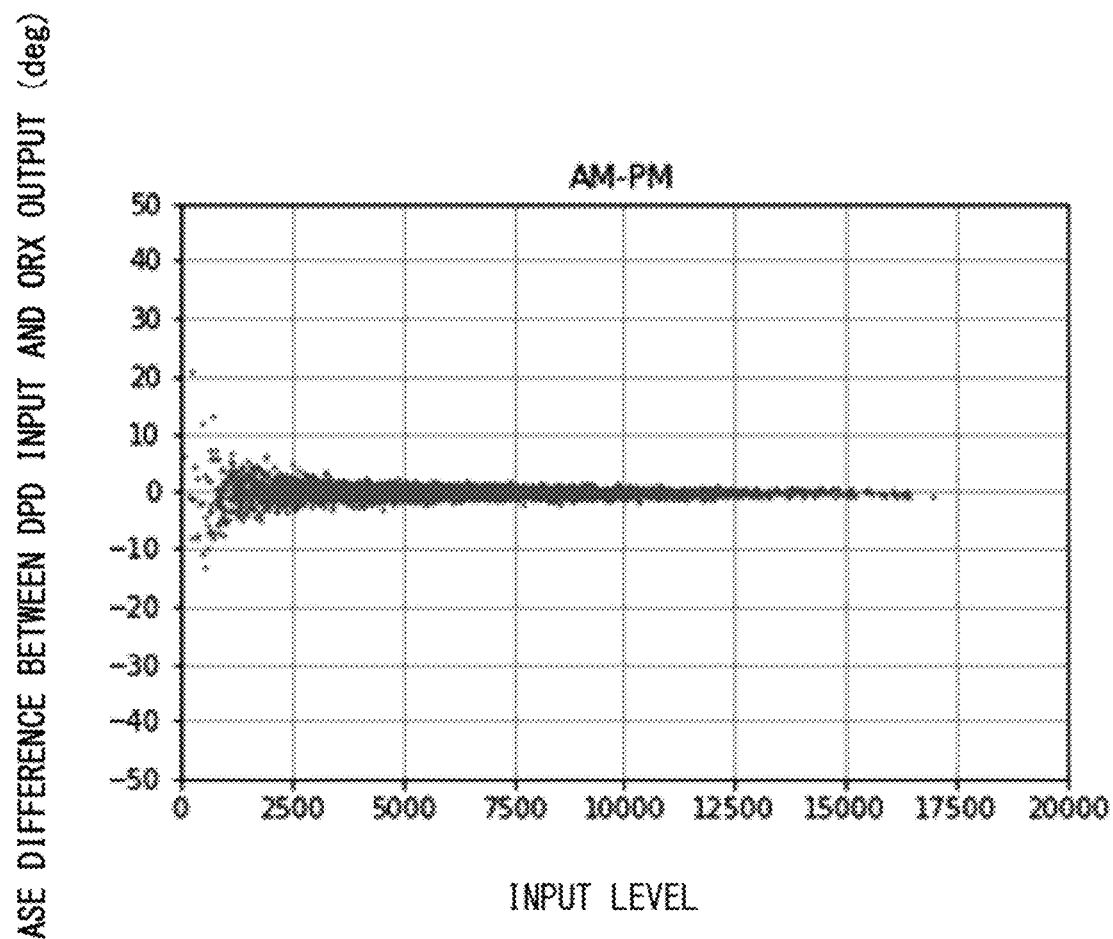
FIG. 15 is a diagram illustrating one example of AM-PM characteristics after the DPD compensation processing according to the second example embodiment of the present disclosure.

By executing processing as described, the DL signal and the DL calibration signal will have characteristics similar to the AM-AM characteristics and the AM-PM characteristics as illustrated in FIG. 14 and FIG. 15, and the influences of the non-linear distortion and the memory effect can be reduced.

As described above, the radio communication apparatus 200 can change the level of the DL calibration signal output from the CAL-TRX 207 depending on the DL signal by adding the DL signal monitoring unit 301 to the BB unit 300 and connecting the DL signal monitoring unit 301 to the CAL-TRX 207. Thus, the radio communication apparatus 200 according to the present example embodiment, i.e., the signal processing apparatus 100 can reduce the non-linear distortion of the amplifier and distortion caused by the memory effect of the amplifier in the calibration signal.

The radio communication apparatus 200 according to the present example embodiment can reduce the non-linear distortion of the amplifier and the distortion caused by the memory effect of the amplifier in the calibration signal.

Third Example Embodiment

In the second example embodiment, the operation executed by the DL signal monitoring unit 301 is to acquire an average level as indicated in the equation 1; however, in the present example embodiment, the calculation is to acquire any desired value of power other than the average level.

The DL signal monitoring unit 301 performs, based on the input DL signal, operation for generating a calibration signal and inputs the result of operation to the CAL-TRX 207. As will be described below, the operation by the DL signal monitoring unit 301 may be to acquire any desired value of power that can be calculated from the DL signal other than the average value of power.

Figure 16:
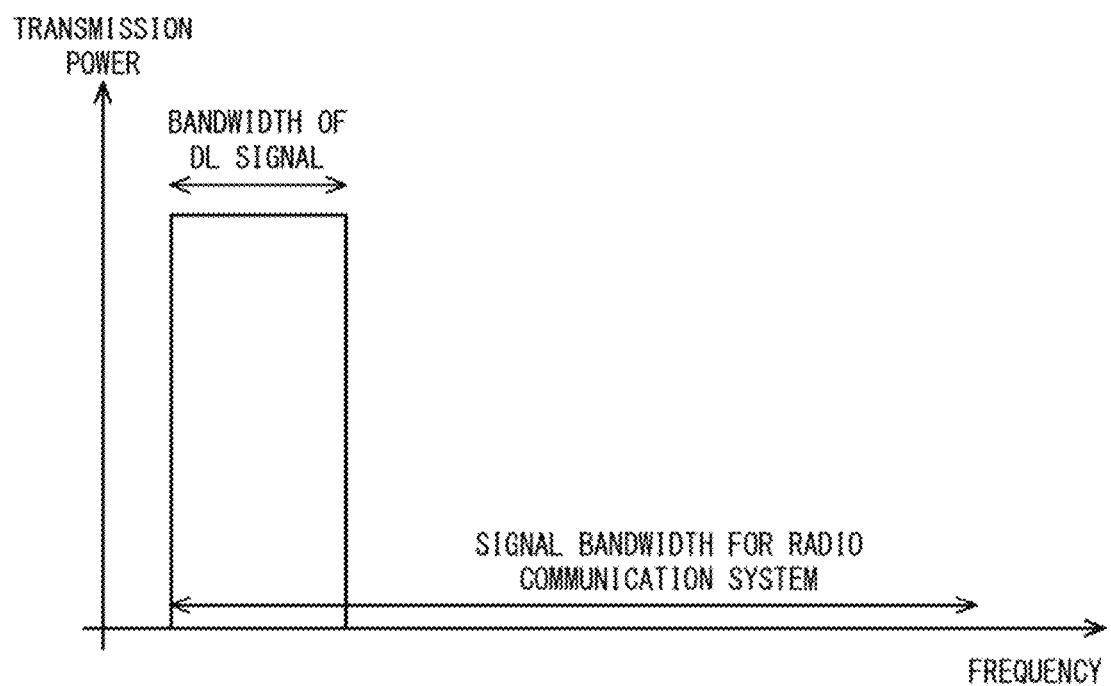
FIG. 16 is a diagram illustrating one example of a frequency bandwidth of a DL signal according to a third example embodiment of the present disclosure.

As a specific example, a method of calculating a bandwidth from the DL signal input to the DL signal monitoring unit 301 is described with reference to FIG. 16. FIG. 16 is a diagram illustrating one example of a frequency bandwidth of the DL signal according to the present example embodiment. When the DL signal input to the DL signal monitoring unit 301 occupies only a portion of the signal bandwidth for the radio communication apparatus 200 as illustrated in FIG. 16, the bandwidth of the DL signal is calculated by performing FFT (Fast Fourier Transform) on the IQ value of the DL signal. The calculated bandwidth is input to the CAL-TRX 207, the CAL-TRX 207 then selects a DL CAL signal that has the same bandwidth as that of the received signal from the signals as illustrated in FIG. 7 and inputs the signal to the TRX-BB unit 202.

The AM-AM characteristic and the AM-PM characteristic of the transmitting amplifier 402 vary depending on the frequency. In other words, the AM-AM characteristic and the AM-PM characteristic vary depending not only on the level of input to the transmitting amplifier 402 but also on the frequency bandwidth of the input.

Therefore, according to the radio communication apparatus 200 of the present example embodiment, by limiting the bandwidth of the DL-CAL signal to the same bandwidth as that of the DL signal, accuracy of the calibration can be improved.

Other Example Embodiments

The signal processing apparatus 10 according to the present disclosure includes, for example, an example embodiment as a signal processing method. In other words, the signal processing method includes: a regulation step in which one or both of an input signal and a calibration signal for performing calibration of transmission systems are regulated in such a way that difference between signal power of the input signal and signal power of the calibration signal is reduced; a compensation step in which distortion compensation is performed on the input signal and the calibration signal; an amplification step in which the input signal and the calibration signal are amplified; and an output step in which the input signal and the calibration signal, both of which have been regulated by the regulation unit, are output to the amplifier.

In the example described above, a program may be stored and supplied to a computer using various types of non-transitory computer readable media. Non-transitory computer readable media include various types of tangible storage media. Examples of non-transitory computer readable media include, for example, magnetic recording media, magneto-optical recording media, CD-ROM (Read Only Memory) discs, CD-R discs, CD-R/W discs, and semiconductor memories. Semiconductor memories include, for example, mask ROM, PROM (Programmable ROM), EPROM (Erasable PROM), flash ROM, and RAM (Random Access Memory). The program may be supplied to a computer using various types of transitory computer readable media. Examples of transitory computer readable media include electric signals, optical signals, and electromagnetic waves. Transitory computer readable media may enable programs to be supplied to a computer via a wired communication path such as an electric wire or an optical fiber or a wireless communication path.

The program described above is a program that causes the signal processing apparatus 10 to execute: regulation processing in which one or both of an input signal and a calibration signal for performing calibration of transmission systems are regulated in such a way that difference between signal power of the input signal and signal power of the calibration signal is reduced; and output processing in which the input signal and the calibration signal, both of which have been regulated by the regulation unit, are output to the amplifier.

Note that the present disclosure is not limited to the example embodiments described above, and maybe appropriately modified without departing from the spirit and the scope of the present disclosure. For example, some or all of the aforementioned example embodiments may be described as in the following Supplementary Notes, but are not limited to the following.

Supplementary Note 1

A signal processing apparatus comprising:
a regulation unit configured to regulate one or both of an input signal and a calibration signal for performing calibration of transmission systems so that a difference between signal power of the input signal and signal power of the calibration signal is reduced;
a compensation unit configured to perform distortion compensation for the input signal and the calibration signal;
an amplifier configured to amplify the input signal and the calibration signal; and
an output unit configured to output the input signal and the calibration signal that have been regulated by the regulation unit to the amplifier.

Supplementary Note 2

The signal processing apparatus according to Supplementary Note 1, wherein the regulation unit is configured to regulate the signal power of the calibration signal.

Supplementary Note 3

The signal processing apparatus according to Supplementary Note 2, wherein the regulation unit is configured to regulate the calibration signal based on an average power value of each of the input signal and the calibration signal.

Supplementary Note 4

The signal processing apparatus according to Supplementary Note 2, wherein the regulation unit is configured to regulate the signal power of the calibration signal by calculating a frequency bandwidth of the input signal by means of Fast Fourier Transform (FFT) based on an In-Phase/Quadrature-Phase (IQ) value of the input signal.

Supplementary Note 5

The signal processing apparatus according to any one of Supplementary Notes 2 to 4, further comprising:
a directional coupler configured to feed back a signal amplified by the amplifier to the regulation unit,
wherein the regulation unit is configured to regulate the calibration signal that has been fed back based on power of the calibration signal.

Supplementary Note 6

The signal processing apparatus according to any one of Supplementary Notes 1 to 5, wherein the regulation unit is configured to reduce a maximum power component of the calibration signal so as to be equal to or less than a threshold value.

Supplementary Note 7

The signal processing apparatus according to any one of Supplementary Notes 2 to 6, wherein the regulation unit is configured to regulate the calibration signal for each channel of the input signal.

Supplementary Note 8

The signal processing apparatus according to any one of Supplementary Notes 1 to 7, wherein the compensation unit is configured to perform Digital Pre-Distortion (DPD) for compensating a distortion characteristic and a memory effect of the amplifier.

Supplementary Note 9

The signal processing apparatus according to any one of Supplementary Notes 2 to 8, wherein the compensation unit is configured to execute processing of compensating the input calibration signal by using a stored Look-Up Table (LUT).

Supplementary Note 10

The signal processing apparatus according to Supplementary Note 9, wherein the LUT is a table in which an In-phase/Quadrature-phase (IQ) value of the input signal and a DPD compensation coefficient corresponding to the IQ value are associated with each other.

Supplementary Note 11

The signal processing apparatus according to Supplementary Note 10, wherein the DPD compensation coefficient is a coefficient for compensating non-linear Amplitude Modulation-Phase Modulation (AM-AM/AM-PM) that causes non-linear distortion of an amplifier.

Supplementary Note 12

The signal processing apparatus according to Supplementary Note 10 or 11, wherein the compensation unit is configured to select the DPD compensation coefficient based on amplitudes and phases of the input signal and the calibration signal.

Supplementary Note 13

A radio communication apparatus comprising:
regulating means for regulating one or both of an input signal and a calibration signal for performing calibration of transmission systems in such a way that a difference between signal power of the input signal and signal power of the calibration signal is reduced;
compensating means for performing distortion compensation for the input signal and the calibration signal;
an amplifier configured to amplify the input signal and the calibration signal; and
output means for outputting the input signal and the calibration signal that have been regulated by the regulating means to the amplifier.

Supplementary Note 14

The radio communication apparatus according to Supplementary Note 13, wherein the radio communication apparatus is configured to perform radio communication by means of a Time Division Duplex (TDD) mode.

Supplementary Note 15

The radio communication apparatus according to Supplementary Note 13 or 14, wherein the regulating means is configured to regulate the signal power of the calibration signal.

Supplementary Note 16

The radio communication apparatus according to Supplementary Note 14 or 15, wherein the regulating means is configured to regulate the calibration signal based on an average power value of each of the input signal and the calibration signal.

Supplementary Note 17

The radio communication apparatus according to Supplementary Note 15 or 16, wherein the regulating means is configured to regulate the signal power of the calibration signal by calculating a frequency bandwidth of the input signal by means of Fast Fourier Transform (FFT) based on an In-Phase/Quadrature-Phase (IQ) value of the input signal.

Supplementary Note 18

The radio communication apparatus according to any one of Supplementary Notes 15 to 17, further comprising:
a directional coupler configured to feed back a signal amplified by the amplifier to the regulating means,
wherein the regulating means is configured to regulate the calibration signal that has been fed back based on power of the calibration signal.

Supplementary Note 19

The radio communication apparatus according to any one of Supplementary Notes 13 to 18, wherein the regulating means is configured to reduce a maximum power component of the calibration signal so as to be equal to or less than a threshold value.

Supplementary Note 20

The radio communication apparatus according to any one of Supplementary Notes 15 to 19, wherein the regulating means is configured to regulate the calibration signal for each channel of the input signal.

Supplementary Note 21

The radio communication apparatus according to any one of Supplementary Notes 13 to 20, wherein the compensating means is configured to perform Digital Pre-Distortion (DPD) for compensating a distortion characteristic and a memory effect of the amplifier.

Supplementary Note 22

The radio communication apparatus according to any one of Supplementary Notes 15 to 21, wherein the compensating means is configured to execute processing of compensating the input calibration signal by using a stored Look-Up Table (LUT).

Supplementary Note 23

The radio communication apparatus according to Supplementary Note 22, wherein the LUT is a table in which an In-phase/Quadrature-phase (IQ) value of the input signal and a DPD compensation coefficient corresponding to the IQ value are associated with each other.

Supplementary Note 24

The radio communication apparatus according to Supplementary Note 23, wherein the DPD compensation coefficient is a coefficient for compensating non-linear Amplitude Modulation-Phase Modulation (AM-AM/AM-PM) that causes non-linear distortion of an amplifier.

Supplementary Note 25

The radio communication apparatus according to Supplementary Note 23 or 24, wherein the compensating means is configured to select the DPD compensation coefficient based on amplitudes and phases of the input signal and the calibration signal.

Supplementary Note 26

A signal processing method comprising:
a regulation step of regulating one or both of an input signal and a calibration signal for performing calibration of transmission systems so that a difference between signal power of the input signal and signal power of the calibration signal is reduced;
a compensation step of performing distortion compensation for the input signal and the calibration signal;
an amplification step of amplifying the input signal and the calibration signal; and
an output step of outputting the input signal and the calibration signal that have been regulated in the regulation step to the amplifier.

Supplementary Note 27

The signal processing method according to Supplementary Note 26, wherein the regulation step includes regulating the signal power of the calibration signal.

Supplementary Note 28

The signal processing method according to Supplementary Note 27, wherein the regulation step includes regulating the calibration signal based on an average power value of each of the input signal and the calibration signal.

Supplementary Note 29

The signal processing method according to Supplementary Note 27, wherein the regulation step includes regulating the signal power of the calibration signal by calculating a frequency bandwidth of the input signal by means of Fast Fourier Transform (FFT) based on an In-Phase/Quadrature-Phase (IQ) value of the input signal.

Supplementary Note 30

The signal processing method according to any one of Supplementary Notes 26 to 29, wherein the regulation step includes reducing a maximum power component of the calibration signal so as to be equal to or less than a threshold value.

Supplementary Note 31

The signal processing method according to any one of Supplementary Notes 27 to 30, wherein the regulation step includes regulating the calibration signal for each channel of the input signal.

Supplementary Note 32

The signal processing method according to any one of Supplementary Notes 26 to 31, wherein the compensation step includes performing Digital Pre-Distortion (DPD) for compensating a distortion characteristic and a memory effect that are generated in the amplification step.

Supplementary Note 33

The signal processing method according to any one of Supplementary Notes 27 to 32, wherein the compensation step includes executing processing of compensating the input calibration signal by using a stored Look-Up Table (LUT).

Supplementary Note 34

The signal processing method according to Supplementary Note 33, wherein the LUT is a table in which an In-phase/Quadrature-phase (IQ) value of the input signal and a DPD compensation coefficient corresponding to the IQ value are associated with each other.

Supplementary Note 35

The signal processing method according to Supplementary Note 34, wherein the DPD compensation coefficient is a coefficient for compensating non-linear Amplitude Modulation-Phase Modulation (AM-AM/AM-PM) that causes non-linear distortion to be generated in the amplification step.

Supplementary Note 36

The signal processing method according to Supplementary Note 34 or 35, wherein the compensation step includes selecting the DPD compensation coefficient based on amplitudes and phases of the input signal and the calibration signal.

Supplementary Note 37

A program causing a signal processing apparatus to execute:
regulation processing of regulating one or both of an input signal and a calibration signal for performing calibration of transmission systems so that a difference between signal power of the input signal and signal power of the calibration signal is reduced; and
output processing of outputting the input signal and the calibration signal that have been regulated in the regulation processing to the amplifier.

Supplementary Note 38

The program according to Supplementary Note 37, wherein the regulation processing includes executing processing of regulating the signal power of the calibration signal.

Supplementary Note 39

The program according to Supplementary Note 38, wherein the regulation processing includes executing processing of regulating the calibration signal based on an average power value of each of the input signal and the calibration signal.

Supplementary Note 40

The program according to Supplementary Note 38, wherein the regulation processing includes executing processing of regulating the signal power of the calibration signal by calculating a frequency bandwidth of the input signal by means of Fast Fourier Transform (FFT) based on an In-Phase/Quadrature-Phase (IQ) value of the input signal.

Supplementary Note 41

The program according to any one of Supplementary Notes 37 to 40, wherein the regulation processing includes executing processing of reducing a maximum power component of the calibration signal so as to be equal to or less than a threshold value.

Supplementary Note 42

The program according to any one of Supplementary Notes 38 to 41, wherein the regulation processing includes executing processing of regulating the calibration signal for each channel of the input signal.

The present invention has been described above with reference to the example embodiments; however, the present invention is not limited by the description above. Various modifications that could be understood by those skilled in the art may be made to the configurations or details of the present invention within the scope of the present invention.

This application claims priority to Japanese patent application No. 2021-046725, filed on Mar. 22, 2021, the entire disclosure of which is incorporated herein.

REFERENCE SIGNS LIST

10, 100 SIGNAL PROCESSING APPARATUS
11 REGULATION UNIT
12 COMPENSATION UNIT
13 AMPLIFIER
14 OUTPUT UNIT
101 DL SIGNAL MONITORING UNIT
102 CAL-TRX
103 DISTORTION COMPENSATION UNIT
104 AMPLIFIER

What is claimed is:
1. A signal processing apparatus comprising:
a memory storing instructions;
a processor configured to execute the instructions to:
regulate one or both of an input signal and a calibration signal for performing calibration of transmission systems in such a way that a difference between signal power of the input signal and signal power of the calibration signal is reduced; and perform distortion compensation for the input signal and the calibration signal; and an amplifier configured to amplify the input signal and the calibration signal, wherein the processor is further configured to the instructions to output the input signal and the calibration signal that have been regulated to the amplifier.

2. The signal processing apparatus according to claim 1, wherein the processor is configured to regulate the signal power of the calibration signal.

3. The signal processing apparatus according to claim 2, wherein the processor is configured to regulate the calibration signal based on an average power value of each of the input signal and the calibration signal.

4. The signal processing apparatus according to claim 2, wherein the processor is configured to regulate the signal power of the calibration signal by calculating a frequency bandwidth of the input signal by means of Fast Fourier Transform (FFT) based on an In-Phase/Quadrature-Phase (IQ) value of the input signal.

5. The signal processing apparatus according to claim 2, further comprising:

a directional coupler configured to feed back a signal amplified by the amplifier to the processor, wherein the processor is configured to regulate the calibration signal that has been fed back based on power of the calibration signal.

6. The signal processing apparatus according to claim 2, wherein the processor is configured to regulate the calibration signal for each channel of the input signal.

7. The signal processing apparatus according to claim 2, wherein the processor is configured to execute processing of compensating the input calibration signal by using a stored Look-Up Table (LUT).

8. The signal processing apparatus according to claim 7, wherein the LUT is a table in which an In-phase/Quadrature-phase (IQ) value of the input signal and a DPD compensation coefficient corresponding to the IQ value are associated with each other.

9. The signal processing apparatus according to claim 8, wherein the DPD compensation coefficient is a coefficient for compensating non-linear Amplitude Modulation-Phase Modulation (AM-AM/AM-PM) that causes non-linear distortion of an amplifier.

10. The signal processing apparatus according to claim 8, wherein the processor is configured to select the DPD compensation coefficient based on amplitudes and phases of the input signal and the calibration signal.

11. The signal processing apparatus according to claim 1, wherein the processor is configured to reduce a maximum power component of the calibration signal so as to be equal to or less than a threshold value.

12. The signal processing apparatus according to claim 1, wherein the processor is configured to perform Digital Pre-Distortion (DPD) for compensating a distortion characteristic and a memory effect of the amplifier.

13. A radio communication apparatus comprising:
a memory storing instructions;
a processor configured to execute the instructions to:
regulate one or both of an input signal and a calibration signal for performing calibration of transmission systems in such a way that a difference between signal power of the input signal and signal power of the calibration signal is reduced; and perform distortion compensation for the input signal and the calibration signal; and an amplifier configured to amplify the input signal and the calibration signal, wherein the processor is further configured to the instructions to output the input signal and the calibration signal that have been regulated to the amplifier.

14. The radio communication apparatus according to claim 13, wherein the radio communication apparatus is configured to perform radio communication by means of a Time Division Duplex (TDD) mode.

15. The radio communication apparatus according to claim 13, wherein the processor is configured to regulate the signal power of the calibration signal.

16. The radio communication apparatus according to claim 15, wherein the processor is configured to regulate the calibration signal based on an average power value of each of the input signal and the calibration signal.

17. The radio communication apparatus according to claim 15, wherein the processor is configured to regulate the signal power of the calibration signal by calculating a frequency bandwidth of the input signal by means of Fast Fourier Transform (FFT) based on an In-Phase/Quadrature-Phase (IQ) value of the input signal.

18. The radio communication apparatus according to claim 15, further comprising:

a directional coupler configured to feed back a signal amplified by the amplifier to the processor, wherein the processor is configured to regulate the calibration signal that has been fed back based on power of the calibration signal.

19. The radio communication apparatus according to claim 13, wherein the processor is configured to reduce a maximum power component of the calibration signal so as to be equal to or less than a threshold value.

20. A non-transitory computer readable medium storing a program causing a signal processing apparatus to execute:
regulation processing of regulating one or both of an input signal and a calibration signal for performing calibration of transmission systems so that a difference between signal power of the input signal and signal power of the calibration signal is reduced; and output processing of outputting the input signal and the calibration signal that have been regulated in the regulation processing to an amplifier.

* * * * *